(12) United States Patent  
Ahn et al.

(10) Patent No.: US 12,155,842 B2  
(45) Date of Patent: *Nov. 26, 2024

(54) METHOD AND APPARATUS FOR ENCODING/DECODING VIDEO SIGNAL

(71) Applicant: INTELLECTUAL DISCOVERY CO., LTD., Seoul (KR)

(72) Inventors: Yong Jo Ahn, Seoul (KR); Dong Gyu Sim, Seoul (KR); Ho Chan Ryu, Seoul (KR); Seanae Park, Seoul (KR); Byung Tae Oh, Seoul (KR); Byung Cheol Song, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,040

(22) Filed: Jul. 11, 2023

(65) Prior Publication Data

US 2023/0353757 A1 Nov. 2, 2023

Related U.S. Application Data

(63) Continuation of application No. 17/836,347, filed on Jun. 9, 2022, now Pat. No. 11,770,539, which is a (Continued)

(30) Foreign Application Priority Data

Mar. 24, 2016 (KR) .................. 10-2016-0035090  
Mar. 25, 2016 (KR) .................. 10-2016-0035674  
(Continued)

(51) Int. Cl.  
*H04N 19/105* (2014.01)  
*H04N 19/129* (2014.01)  
(Continued)

(52) U.S. Cl.  
CPC ......... *H04N 19/159* (2014.11); *H04N 19/105* (2014.11); *H04N 19/129* (2014.11);  
(Continued)

(58) Field of Classification Search  
CPC .................................................. H04N 19/159  
See application file for complete search history.

(56) References Cited

U.S. PATENT DOCUMENTS 6,985,526 B2 * 1/2006 Bottreau ............... H04N 19/36  
375/240.09  
7,929,606 B2 * 4/2011 Jeon ..................... H04N 19/187  
382/233

(Continued)

FOREIGN PATENT DOCUMENTS

JP 2000-244927 A 9/2000  
KR 10-2001-0105361 A 11/2001  
(Continued)

OTHER PUBLICATIONS

International Search Report issued on Aug. 29, 2017 in counterpart International Patent Application No. PRC/KR2017/003082 (11 pages).

(Continued)

*Primary Examiner* — Irfan Habib  
(74) *Attorney, Agent, or Firm* — Sughrue Mion, PLLC

(57) ABSTRACT

A video encoding/decoding apparatus according to the present invention acquires motion vector refinement information, performs motion compensation on the basis of a motion vector of a current block, refines the motion vector of the current block using at least one or both of the motion vector refinement information and the output of the motion compensation, and performs motion compensation using the refined motion vector.

5 Claims, 18 Drawing Sheets

Related U.S. Application Data continuation of application No. 16/993,628, filed on Aug. 14, 2020, now Pat. No. 11,388,420, which is a continuation of application No. 16/087,787, filed as application No. PCT/KR2017/003082 on Mar. 22, 2017, now Pat. No. 10,778,987.

(30) Foreign Application Priority Data

| Apr. 22, 2016 | (KR) | 10-2016-0049485 |
|---|---|---|
| May 3, 2016 | (KR) | 10-2016-0054607 |
| May 4, 2016 | (KR) | 10-2016-0055370 |

(51) Int. Cl.

| H04N 19/13 | (2014.01) |
|---|---|
| H04N 19/157 | (2014.01) |
| H04N 19/159 | (2014.01) |
| H04N 19/176 | (2014.01) |
| H04N 19/18 | (2014.01) |
| H04N 19/513 | (2014.01) |
| H04N 19/523 | (2014.01) |
| H04N 19/593 | (2014.01) |
| H04N 19/82 | (2014.01) |
| H04N 19/91 | (2014.01) |

(52) U.S. Cl.
CPC ........... *H04N 19/13* (2014.11); *H04N 19/157* (2014.11); *H04N 19/176* (2014.11); *H04N 19/18* (2014.11); *H04N 19/513* (2014.11); *H04N 19/523* (2014.11); *H04N 19/593* (2014.11); *H04N 19/82* (2014.11); *H04N 19/91* (2014.11)

(56) References Cited

U.S. PATENT DOCUMENTS

| 8,228,984 | B2* | 7/2012 | Jeon | H04N 19/11 |
| | | | | 382/233 |
| 8,249,159 | B2* | 8/2012 | Li | H04N 19/523 |
| | | | | 375/240.11 |
| 8,437,401 | B2* | 5/2013 | Novotny | H04N 19/56 |
| | | | | 375/240.16 |
| 9,609,343 | B1* | 3/2017 | Chen | H04N 19/11 |
| 10,397,600 | B1* | 8/2019 | Xu | H04N 19/52 |
| 10,602,155 | B2* | 3/2020 | Kwak | H04N 19/182 |
| 2009/0232211 | A1 | 9/2009 | Chen et al. | |
| 2011/0158320 | A1* | 6/2011 | Zheng | H04N 19/50 |
| | | | | 375/E7.125 |
| 2012/0170660 | A1 | 7/2012 | Novotny et al. | |
| 2013/0034157 | A1* | 2/2013 | Helle | H04N 19/463 |
| | | | | 375/E7.243 |
| 2013/0034171 | A1* | 2/2013 | Winken | H04N 19/159 |
| | | | | 375/E7.026 |
| 2013/0342644 | A1* | 12/2013 | Rusanovskyy | H04N 19/597 |
| | | | | 348/43 |
| 2014/0219334 | A1 | 8/2014 | Park | |
| 2015/0036749 | A1* | 2/2015 | Jeon | H04N 19/176 |
| | | | | 375/240.16 |
| 2015/0195566 | A1* | 7/2015 | Hinz | H04N 19/136 |
| 2016/0080759 | A1* | 3/2016 | Nishitani | H04N 19/513 |
| | | | | 375/240.16 |
| 2016/0366416 | A1* | 12/2016 | Liu | G06T 7/246 |
| 2017/0070745 | A1* | 3/2017 | Lee | H04N 19/147 |
| 2018/0098087 | A1* | 4/2018 | Li | H04N 19/132 |
| 2018/0192072 | A1* | 7/2018 | Chen | H04N 19/119 |
| 2018/0242004 | A1* | 8/2018 | Park | H04N 19/52 |
| 2018/0376166 | A1* | 12/2018 | Chuang | H04N 19/61 |
| 2019/0014342 | A1* | 1/2019 | Li | H04N 19/55 |
| 2019/0089961 | A1* | 3/2019 | Ahn | H04N 19/593 |
| 2019/0246143 | A1* | 8/2019 | Zhang | H04N 19/159 |
| 2019/0313115 | A1* | 10/2019 | Chao | H04N 19/176 |
| 2019/0320199 | A1* | 10/2019 | Chen | H04N 19/00 |
| 2019/0349589 | A1* | 11/2019 | Lee | H04N 19/513 |
| 2020/0029087 | A1* | 1/2020 | Lim | H04N 19/52 |

FOREIGN PATENT DOCUMENTS

| KR | 10-2009-0012926 A | 2/2009 |
|---|---|---|
| KR | 10-2011-0001991 A | 1/2011 |
| KR | 10-2012-0090740 A | 8/2012 |
| KR | 10-2013-0049526 A | 5/2013 |
| KR | 10-2014-0025590 A | 3/2014 |
| KR | 10-2014-0074346 A | 6/2014 |
| KR | 10-2014-0098725 A | 8/2014 |
| KR | 10-2014-0140006 A | 12/2014 |
| KR | 10-20160017666 A | 2/2016 |
| KR | 10-2016-0023917 A | 3/2016 |
| WO | 2007/042063 A1 | 4/2007 |
| WO | 2009/051419 A2 | 4/2009 |
| WO | 2013/001793 A1 | 1/2013 |
| WO | 2013/016298 A1 | 1/2013 |
| WO | 2013/064098 A1 | 5/2013 |

OTHER PUBLICATIONS

McCann, Ken et al., "Samsung's Response to the Call for Proposals on Video Compression Technology", Joint Collaborative Team on Video Coding (JCT-VC) of ITU-T SG16 WP3 and ISO/IEC JTC1/SC29/WG11, 1st Meeting: Dresden, Germany, Apr. 15-23, 2010 (42 pages in English).

* cited by examiner

FIG. 14
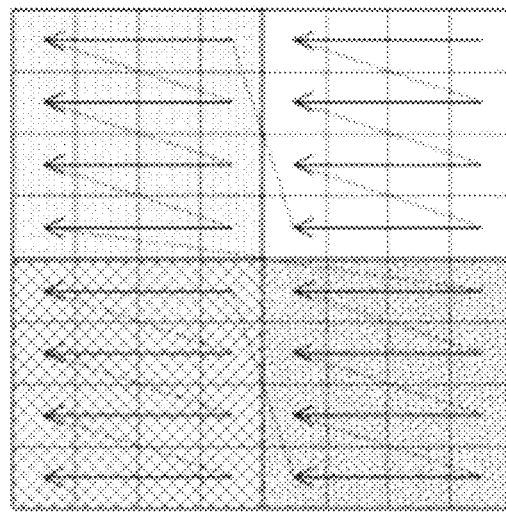
(c) Vertical
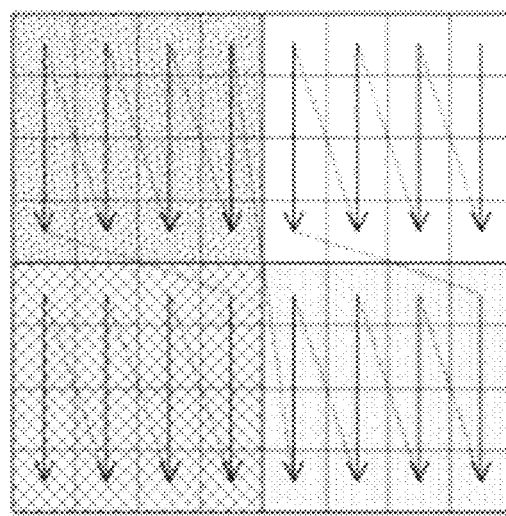
(b) Horizontal
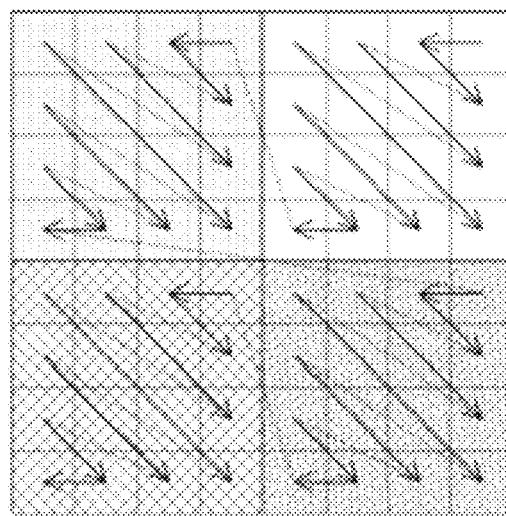
(a) Diagonal (a)Diagonal   (b)Vertical   (c)Horizontal   (d)Long vertical (a)Diagonal   (c)Horizontal   (d)Long vertical (b)Vertical FIG. 17
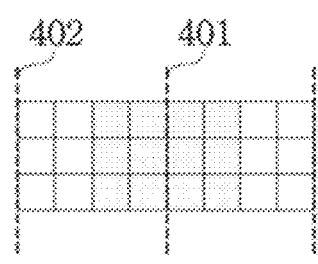
(a)
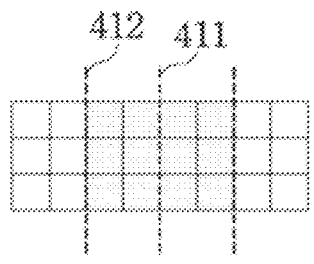
(b)
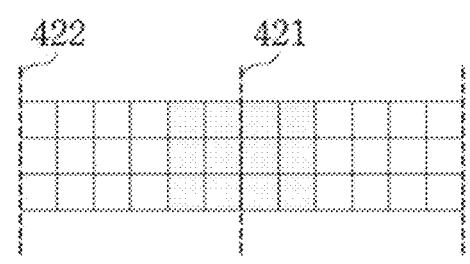
(c)
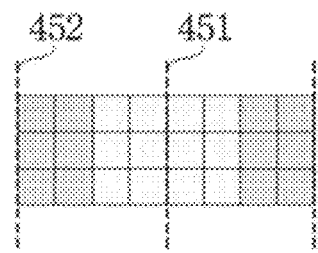
(e)
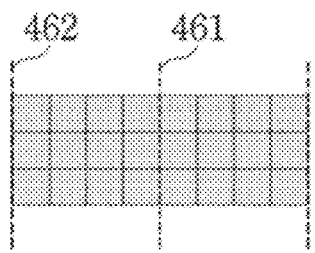
(f)
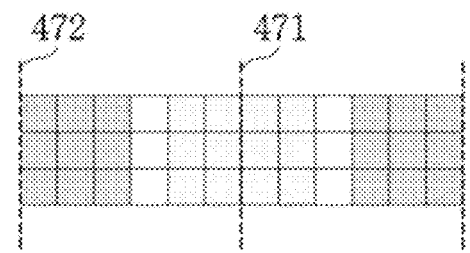
(g)

FIG. 19
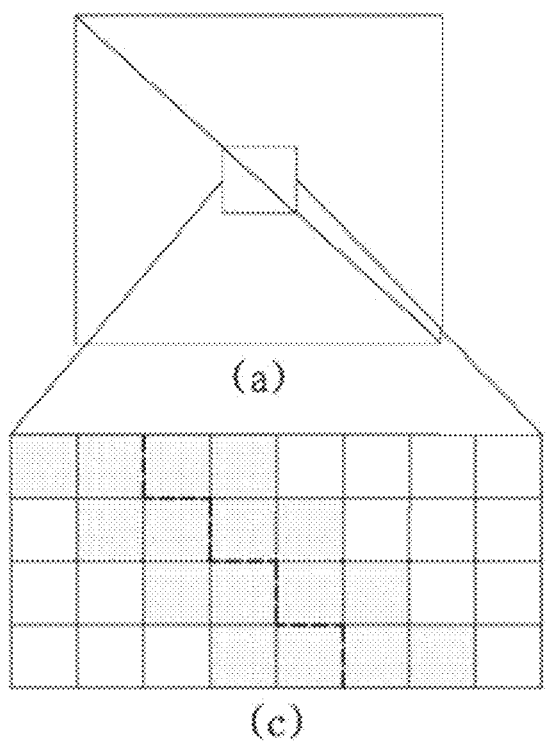
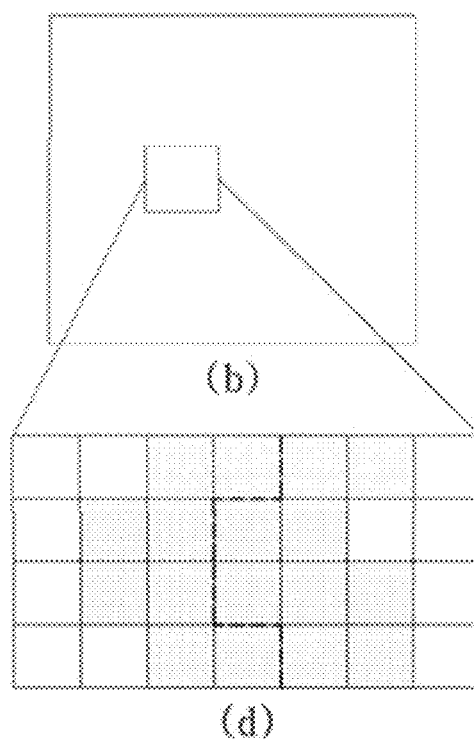

METHOD AND APPARATUS FOR ENCODING/DECODING VIDEO SIGNAL

CROSS-REFERENCE TO RELATED APPLICATION (S)

This is a continuation of U.S. application Ser. No. 17/836,347 filed Jun. 9, 2022, which is a continuation of U.S. application Ser. No. 16/993,628 filed Aug. 14, 2020, which is a continuation of U.S. application Ser. No. 16/087,787 filed Sep. 24, 2018, which is a U.S. National Stage Application of International Application No. PCT/KR2017/003082, filed on Mar. 22, 2017, which claims the benefit of Korean Patent Application No. 10-2016-0035090, filed on Mar. 24, 2016, Korean Patent Application No. 10-2016-0035674, filed on Mar. 25, 2016, Korean Patent Application No. 10-2016-0049485, filed on Apr. 22, 2016, Korean Patent Application No. 10-2016-0054607, filed on May 3, 2016, and Korean Patent Application No. 10-2016-0055370, filed on May 4, 2016, in the Korean Intellectual Property Office, the entire disclosures of which are incorporated by reference for all purposes.

TECHNICAL FIELD

The present invention relates to a method and apparatus for encoding or decoding a video signal.

BACKGROUND ART

Recently, the demand for high-resolution and high-quality videos such as high-definition or ultra-high-definition videos has increased in various fields. As the videos are improved in resolution and quality, the amount of data of videos increases compared to conventional videos. Therefore, when such a high quality video is stored in an existing storage medium or transmitted over an existing wired or wireless broadband communication network, transmission and storage costs accordingly increase. In order to solve this problem with increase in the demand for high-resolution and high-quality videos, highly efficient video compression technologies may be used.

There are various video compression technologies such as an inter-picture prediction technology for predicting values of pixels in a current picture from a previous picture or a future picture of a current picture, an intra-picture prediction technology for predicting values of pixels in a region of a current picture from another region of the current picture, and an entropy coding technology for allocating shorter codes to pixels with higher probabilities and longer codes to pixels with lower probabilities. With these video compression technologies, video data can be effectively compressed, transmitted, and stored.

In addition, the demand for a new video service such as stereoscopic video content has increased with an increasing demand for high-resolution videos. For this reason, video compression technologies for effectively providing high-definition or ultra-high-definition stereoscopic video content have been under discussion and development.

DETAILED DESCRIPTION OF THE INVENTION

Technical Problem

The present invention is intended to improve coding efficiency of a CABAC context model.

The present invention is intended to improve an inter prediction compression efficiency.

The present invention is intended to improve an intra prediction compression efficiency.

The present invention is intended to provide a method of scanning a non-square transform block.

The present invention is intended to provide a method of performing adaptive in-loop filtering.

Technical problems to be solved by the present embodiment are not limited to the above-described ones and there may be other technical problems to be solved by the present invention.

Technical Solution

The present invention provides a method and apparatus for adaptively initializing a CABAC context model.

The present invention provides a method and apparatus for refining an encoded/decoded motion vector and performing motion compensation based on the refined motion vector.

The present invention provides a unidirectional/bidirectional intra prediction method and apparatus for partitioning a current block into multiple sub-blocks and reconstructing each sub-block one by one according to a predetermined priority.

The present invention provides a method and apparatus for selectively using one scan type from among a plurality of scan types according to a group of N×M coefficients.

The present invention provides a method and apparatus for applying in-loop filtering to a boundary between virtual blocks having different motion vectors.

Advantageous Effect

According to the present invention, it is possible to improve coding performance by using a state of a CABAC context model, which is stored in the process of coding a previous picture in terms of the encoding/decoding order or coding a reference picture using the same QP as a current picture, as an initial value of a CABAC context model of a current picture.

In addition, according to the present invention, the coding performance can be improved by referring to the state of the CABAC context model stored in parallelization units within a reference picture, which correspond to respective parallelization units within the current picture.

In addition, according to the present invention, a more accurately represented video can be reconstructed and coding efficiency is increased by performing additional refinement on an encoded/decoded motion vector.

According to the present invention, compression efficiency of intra prediction can be improved by using a unidirectional/bidirectional prediction technique.

According to the present invention, transform coefficients can be effectively scanned.

According to the present invention, a subjective or objective video quality improvement can be obtained by applying in-loop filtering to a boundary between virtual blocks having different motion vectors.

BRIEF DESCRIPTION OF DRAWINGS

FIG. 14 is illustrates a method of scanning a square transform block, according to one application example of the present invention;

FIG. 17 illustrates an application range of in-loop filtering according to one application example of the present invention;

FIG. 19 illustrates a method of applying in-loop filtering to a boundary of a geometrical shape according one application example of the present invention.

BEST MODE OF INVENTION

Figure 1:
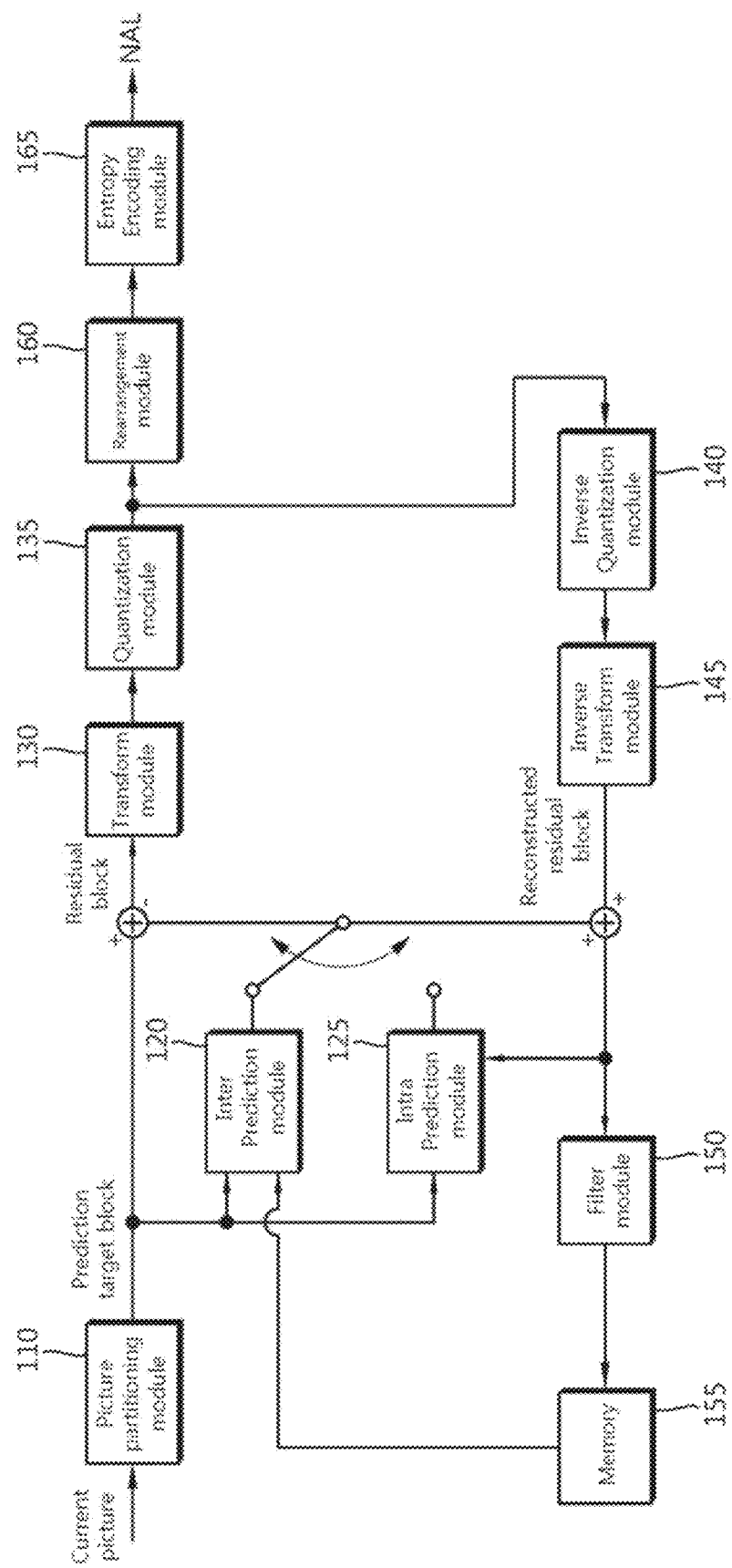
FIG. 1 is a block diagram illustrating a video encoding apparatus according to one embodiment of the present invention.

An inter prediction method according to the present invention includes obtaining motion vector refinement information on a current block, reconstructing a motion vector of the current block, performing primary motion compensation on the current block on the basis of the motion vector, refining the motion vector of the current block using the output of the motion compensation performed on the current block or using at least one piece of the motion vector refinement information, and performing secondary motion compensation on the current block using the refined motion vector.

An intra prediction method according to the present invention includes reconstructing a first sub-block within a current block by performing intra prediction on the first sub-block within the current block on the basis of a reference pixel of the current block and performs an intra prediction on a second sub-block within the current block using at least one of the reference pixel of the current block or a pixel within the reconstructed first sub-block.

A transform coefficient scanning method according to the present invention includes decoding a scanned bit-stream, obtaining transform coefficients of a transform block, and scanning the transform coefficients of the transform block according to a predetermined scan type, in which the scanning may be performed in a per-group basis (wherein the group consists of N×M coefficients) and the scan type may be selected based on a signaled index from among a plurality of scan type candidates.

A video decoding apparatus according to the present invention includes an entropy decoding unit for obtaining motion vector refinement information on a current block and an inter prediction unit for reconstructing a motion vector of the current block, performing primary motion compensation on the current block on the basis of the motion vector, refining the motion vector of the current block using the output of the motion compensation performed on the current block or by using at least one piece of the motion vector refinement information, and performing secondary motion compensation on the current block using the refined motion vector.

A video decoding apparatus according to the present invention may include an intra prediction unit for performing intra prediction on a first sub-block within a current block on the basis of a reference pixel of the current block, reconstructing the first sub-block, and performing intra prediction on a second sub-block within the current block using at least either one or both of the reference pixel of the current block and a pixel within the reconstructed first sub-block.

A video decoding apparatus according to the present invention may include an entropy decoding unit for decoding a scanned bit-stream and obtaining transform coefficients of a transform block and a realignment unit for scanning the transform coefficients of the transform block according to a predetermined scan type, in which the scanning may be performed in a per-group basis (wherein the group consists of N×M coefficients) and the scan type may be selected based on a signaled index from among a plurality of scan type candidates.

MODE FOR INVENTION

The present invention may be embodied in many forms and have various embodiments. Thus, specific embodiments will be illustrated in the drawings and will be described in detail below. While specific embodiments of the invention will be described herein below, they are only illustrative purposes and should not be construed as limiting to the invention. Thus, the invention should be construed to cover not only the specific embodiments but also cover other embodiments and modifications and equivalents to the specific embodiments and other possible embodiments. Throughout the drawings, like reference numbers refer to like elements.

Terms used in the specification, "first", "second", etc. may be used to describe various components, but the components are not to be construed as being limited to the terms. That is, the terms are used to distinguish one component from another component. Therefore, the first component may be referred to as the second component, and the second component may be referred to as the first component. Moreover, the term "and/or" includes any and all combinations of one or more of the associated listed items or includes one or more of the associated listed items.

It is to be understood that when any element is referred to as being "connected to" or "coupled to" another element, it may be connected directly to or coupled directly to another element or be connected to or coupled to another element, having the other element intervening therebetween. On the other hand, when an element is referred to as being "directly connected" or "directly coupled" to another element, it should be understood that there are no other elements in between.

The terminology used herein is for the purpose of describing particular embodiments only and is not intended to limit the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Hereinafter, preferred embodiments of the present embodiment will be described in detail with reference to the accompanying drawings. Like elements are denoted by like reference numerals throughout the drawings, and a description of like elements may not be duplicated herein below.

FIG. 1 is a block diagram of a video encoding apparatus according to one embodiment of the present invention.

Referring to FIG. 1, a video encoding apparatus 100 includes a picture partitioning unit 110, a prediction unit 120+125, a transformation unit 130, a quantization unit 135, a realignment unit 160, an entropy encoding unit 165, a dequantization unit 140, an inverse-transformation unit 145, a filter unit 150, and a memory 155.

Components of the video encoding apparatus illustrated in FIG. 1 are independently shown only in order to indicate that they perform different characteristic functions. Therefore, the components that are independently shown do not mean that each of the components may not be implemented as one piece of hardware or software. That is, although the components are illustrated in divided forms for convenience of explanation, a plurality of components may be combined with each other to thereby be operated as one component, or one component may be further divided into a plurality of components to thereby be operated as the plurality of components. All of these forms are included in the scope of the present invention as long as they do not depart from essential characteristics of the present invention.

In addition, some of the components may not be indispensable components performing essential functions of the present invention but be selective components improving only performance thereof. The present invention may also be implemented only by a structure including the indispensable components except for the selective components, and the structure including only the indispensable components is also included in the scope of the present invention.

The picture partitioning unit 110 may partition an input picture into one or more blocks. In this case, the block may mean a coding unit (CU), a prediction unit (PU), or a transform unit (TU). The partitioning may be performed based on at least one of a quadtree or a binary tree. The quad tree is a partitioning scheme of partitioning one block into quadrants (i.e., four sub-blocks) which are in half in both of the width and the height of the original block. The binary tree is a partitioning scheme of partitioning one block into halves (i.e., two sub-blocks) which are in half in either the height or the width of the original block. In a binary tree structure, when a block is divided in half in the height, a sub-block may have a square shape or a non-square shape, depending on the shape of the original block.

In embodiments of the present invention described herein below, a coding unit may be regarded not only as a basic unit for processing in an encoding process but also a basic unit for processing in a decoding process.

The prediction unit 120+125 may include an inter prediction unit 120 for performing inter prediction and an intra prediction unit 125 for performing intra prediction. For each of the prediction units, a prediction method is first determined. That is, whether to use inter prediction or intra prediction is determined first. Next, concrete information (e.g., a prediction mode for intra prediction, a motion vector, a reference picture, etc.) for the determined prediction method may be determined. Here, it should be noted that a basic unit for performing a prediction process, and a basic unit for determining a prediction method and concrete information for prediction are may differ from each other. That is, a prediction method, a prediction mode, etc. may be determined on a per-PU basis but prediction may be performed on a per-TU basis. A residual value (residual block), which is a difference between an original block and a generated prediction block, may be fed into the transformation unit 130. In addition, prediction mode information which is information on a prediction mode used for the prediction and motion vector information which is information on a motion vector used for the prediction may be encoded together with the residual value by the entropy encoding unit 165, and then transmitted to a decoder. When a specific encoding mode is used, the prediction unit 120+125 may not generate a prediction block but an original block may be encoded as it is and then the resulting signal may be transmitted to the decoder.

The inter prediction unit 120 may generate a prediction unit on the basis of information on at least one of a previous picture and a subsequent picture to a current picture. In some cases, the inter prediction unit 120 may generate a prediction unit on the basis of information on a portion of an encoded region within the current picture. The inter prediction unit 120 may include a reference picture interpolation unit, a motion prediction unit, and a motion compensation unit.

The reference picture interpolation unit may receive information on a reference picture from the memory 155 and generate pixel information of integer pixels or sub-pixels within the reference picture. For luma pixels, a DCT-based eight-tap interpolation filter having different filter coefficients may be used to generate pixel information on integer pixels and sub-pixels on a per-1/4-pixel basis. For chroma pixels, a DCT-based fourth-tap interpolation filter having different filter coefficients may be used to generate pixel information on integer pixels or sub-pixels on a per-1/8-pixel basis.

The motion prediction unit may perform motion prediction on the basis of the interpolated reference picture resulting from interpolation performed by the reference picture interpolation unit. Various motion vector calculation methods such as a full search-based block matching algorithm (FBMA), three step search (TSS), and new tree-step search algorithm (NTS) can be used. A motion vector may have a motion vector value for a half-pixel or a quarter-pixel by performing the pixel interpolation. The motion prediction unit may predict a current prediction unit (PU) while changing motion prediction methods. Various motion prediction methods, such as a skip method, a merge method, and an advanced motion vector prediction (AMVP) method, can be used.

The intra prediction unit 125 may generate a prediction unit (PU) on the basis of information on reference pixels around the current block, i.e., information on pixels within the current picture. In the case where a neighboring block of the current prediction unit is an inter-predicted block and accordingly reference pixels are inter-predicted pixels, reference pixels within the inter-predicted block may be substituted by reference pixels within a neighboring intra-predicted block. That is, when one reference pixel is unavailable, information on at least one available reference pixel may be used to substitute for the unavailable reference pixel.

In the case of intra prediction, there are angular prediction modes in which reference pixels are determined according to a prediction direction and non-angular prediction modes in which direction information is not used in performing prediction. A mode for predicting luma information and a mode for predicting chroma information may differ. In order to predict chroma information, intra prediction mode information used for predicting luma information or predicted luma signal information may be used.

In the intra prediction method, reference pixels may fed into an adaptive intra smoothing filter and then a prediction block may be generated based on the filtered information, depending on a used prediction mode. Different types of AIS filters may be used for filtering reference pixels. In order to perform the intra prediction method, an intra prediction mode for a current PU may be predicted from intra prediction modes of neighboring PUs existing around the current PU. In the case of predicting a prediction mode of the current PU on the basis of mode information predicted from a neighboring PU, when an intra prediction mode of the current PU is identical to that of the neighbor PU, information indicating the fact that the prediction mode of the current PU and the prediction mode of the neighboring PU are identical may be signaled using a predetermined flag. On the other hand, when the prediction modes of the current PU and the neighboring PU are different from each other, prediction mode information on the current block may be encoded through entropy encoding.

In addition, a residual block consisting of residual value information which is a difference value between a prediction unit (PU) produced by the prediction unit 120+125 and the original block of the prediction unit may be generated. The generated residual block may be fed into the transformation unit 130.

The transformation unit 130 may transform the residual block including residual data using a transform method such as DCT or DST. Determination of the transform method may be performed based on the intra prediction mode of the prediction unit used for generating the residual block.

The quantization unit 135 may quantize values in frequency domain which are produced by the transformation unit 130. Quantization coefficients may vary from block to block or may vary depending on importance of a video. The calculated value generated by the quantization unit 135 may be fed into the dequantization unit 140 and the realignment unit 160.

The realignment unit 160 may realign coefficients values with respect to the quantized residual values.

The realignment unit 160 may transform a two-dimension block form of coefficients into a one-dimensional vector form of coefficients using a coefficient scanning method. For example, the realignment unit 160 scans coefficients from a DC coefficient to a high frequency domain coefficient using a predetermined scan type and obtains one-dimensional vector form of coefficients.

The entropy encoding unit 165 performs entropy encoding based on values produced by the realignment unit 160. For the entropy encoding, various methods such as exponential Golomb, context-adaptive variable length coding (CAVLC), or context-adaptive binary arithmetic coding (CABAC) can be used.

The entropy encoding unit 165 may receive various kinds of information, from the realignment unit 160 and the prediction unit 120+125, such as residual value coefficient information and block type information on a per coding unit (CU) basis, prediction mode information, partitioning unit information, prediction unit information, transmission unit information, motion vector information, reference frame information, interpolation information for a block, and filtering information, and then may encode the received information.

The entropy encoding unit 165 may entropy-encode coefficient values which are input on a per-CU basis from the realignment unit 160.

The dequantization unit 140 and the inverse-transformation unit 145 may dequantize and inverse-transform the values quantized and transformed by the quantization unit 135 and the transformation unit 140. The residual value generated through the processes performed in the dequantization unit 140 and the inverse-transform unit 145 will be added to the prediction unit produced through processes performed in the motion estimation unit, the motion compensation unit, and the intra prediction unit included in the prediction unit 120+125 to generate a reconstructed block.

The filter unit 150 may include at least one of a deblocking filter, an offset correction unit, and an adaptive loop filter (ALF).

The deblocking filter can eliminate a block distortion attributable to a boundary between blocks from a reconstructed picture. In order to determine whether it is necessary to perform deblocking, a determination of whether to apply deblocking to the current block may be performed based on pixels included in several rows or columns included in a block. When it is determined that it is necessary to apply deblocking to a block, a strong filter or a weak filter may be selectively used according to the intensity of the deblocking. At the time of performing the deblocking, when both of vertical filtering and horizontal filtering are used, the vertical filtering and the horizontal filtering may be performed in parallel.

The offset correction unit can refine an offset between the deblocked video and the original video on a per-pixel basis. In order to perform offset correction for a certain picture, various offset correction methods can be used: a method of dividing pixels included in a video into a predetermined number of regions, determining a region to undergo the offset correction, and performing offset correction on the determined region; and a method of performing offset correction while taking edge information of each pixel into account.

The ALF may be performed based on a value resulting from comparison between a filtered video and a reconstructed video. Pixels in a video may be divided into a predetermined number of groups, a filter to be used for a certain group is determined, and each group may be filtered using respectively different filters. Information indicating whether to apply ALF may be signaled on a per CU basis for luma signals, and the shape and coefficient of a filter for ALF may vary from block to block. Alternatively, filters for ALF for each block may be identical (fixed) in shape, regardless of characteristics of target blocks to undergo ALF.

The memory 155 may store reconstructed blocks or pictures output from the filter unit 150, and the stored reconstructed blocks or pictures may be fed into the prediction unit 120+125 for the subsequent inter prediction.

Figure 2:
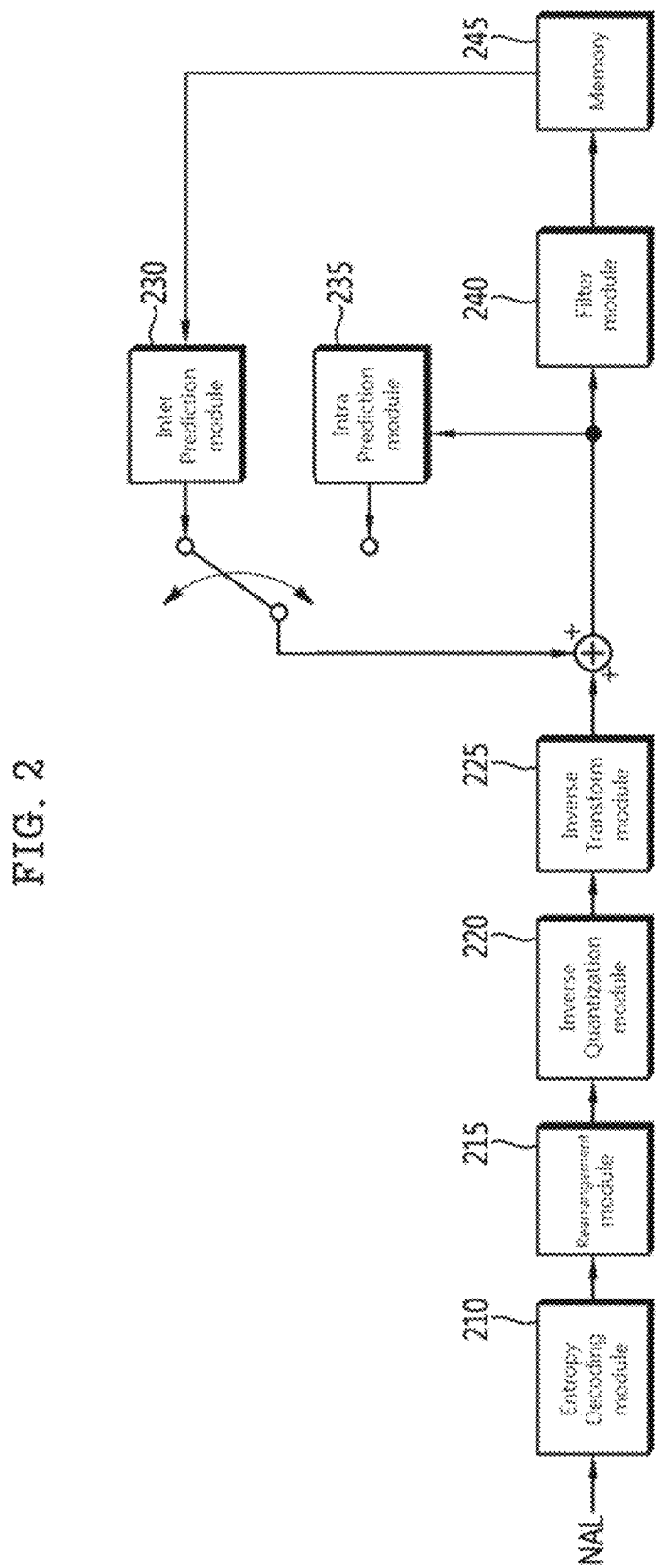
FIG. 2 is a block diagram illustrating a video decoding apparatus according to one embodiment of the present invention.

FIG. 2 is a block diagram illustrating a video decoding apparatus according to one embodiment of the present invention.

Referring to FIG. 2, a video decoder 200 includes an entropy decoding unit 210, a realignment unit 215, a dequantization unit 220, an inverse-transformation unit 225, a prediction unit 230+235, a filter unit 240, and a memory 245.

When a video bit-stream is fed into the video decoder 200 from the video encoder, the bit-stream may be decoded in the reverse sequence to the process sequence performed in the video encoder.

The entropy decoding unit may perform entropy decoding in reverse sequence to the sequence of entropy encoding performed in the entropy encoding unit. For example, various methods such as exponential Golomb, context-adaptive variable length coding (CAVLC), or context-adaptive binary arithmetic coding (CABAC) can be used so as to correspond to the method used in the video encoder.

The entropy decoding unit 210 may decode information associated with intra prediction and inter prediction performed in the encoder.

The realignment unit 215 may realign the bit-stream that is decoded by the entropy decoding unit 210 using a method, which is used by the entropy encoding unit to perform entropy encoding to produce the bit-stream. The coefficients represented in one-dimensional vector form may be rearranged into coefficients in a two-dimensional block form. The realignment unit 215 may receive information on coefficient scanning performed in the encoding unit and perform realignment in reverse sequence to the scanning sequence performed in the encoding unit.

The dequantization unit 220 may perform dequantization on the basis of coding parameters provided by the encoder and coefficient values of realigned blocks.

The inverse-transformation unit 225 may inverse-transform the dequantized transform coefficients using predetermined transform method. In this case, a transform method may be determined based on information on a prediction method (inter/intra prediction), a size/shape of a block, and an intra prediction mode.

The prediction unit 230/235 may generate a prediction block on the basis of information on generation of a prediction block, which is provided by the entropy decoding unit 210, and information on a previously decoded block or picture, which is received from the memory 245.

The prediction unit 230+235 may include a PU determination unit, an inter prediction unit, and an intra prediction unit. The PU determination unit receives various kinds of information such as prediction unit information, prediction mode information used in the intra prediction method, motion compensation information used in the inter prediction method, which are provided by the entropy decoding unit 210, identifies a prediction unit for a current block, and determines whether the prediction unit is an inter-predicted prediction unit or an intra-predicted prediction unit. The inter prediction unit 230 may use information required for inter prediction for a current prediction unit, which is provided by the video encoder and information included in at least one of a previous picture and a subsequent picture of a current picture within which the current prediction unit is included, to perform inter prediction on the current prediction unit. Alternatively, the inter prediction may be performed based on information on a portion of a previously reconstructed region within the current picture in which the current prediction unit is included.

In order to perform inter prediction, for each coding unit, a prediction method for a prediction unit included within the coding unit may be determined. That is, which mode among a skip mode, a merge mode, and an AMVP mode is used for producing a prediction mode may be determined.

The intra prediction unit 235 may generate a prediction unit (PU) on the basis of information on pixels within a current picture. When the prediction unit is a prediction unit generated through intra prediction during encoding, intra prediction may be performed based on intra prediction mode information on the prediction unit, which is provided by the video encoder. The intra prediction unit 235 may include an adaptive intra smoothing filter, a reference picture interpolation unit, and a DC filter. The AIS filter is a unit for performing filtering on reference pixels of the current block and may perform or may not perform filtering, depending on the prediction mode of the current prediction unit. By using the AIS filter information and the prediction mode of the prediction unit provided by the video encoder, AIS filtering may be performed on the reference pixels in the current block. When the prediction mode of the current block is a mode that does not require AIS filtering, the AIS filtering may not be applied.

When the prediction mode of the prediction unit is a prediction unit generated through intra prediction which is performed by pixel values obtained by interpolating reference pixels, the reference pixel interpolation unit may generate a reference pixel value on a per sub-pixel basis by interpolating reference pixels. Reference pixels may not be interpolated when the prediction mode of the current prediction unit is a prediction mode in which a prediction block can be generated without interpolating reference pixels. The DC filter may generate a prediction block by performing filtering when the prediction mode is DC mode.

The reconstructed block or picture may be fed into the filter unit 240. The filter unit 240 may include a deblocking filter, an offset correction unit, and an adaptive loop filter (ALF).

Information may be received from the video decoder: information on whether deblocking filtering is applied to a target block or picture; and information on which filter is used between a strong filter or a weak filter when the deblocking filtering is applied. The deblocking filter of the video decoder may receive deblocking information from the video encoder and perform deblocking filtering on the target block.

The offset correction unit may perform offset correction on the reconstructed video on the basis of information of an offset type and an offset value which have been applied to a video during encoding.

The ALF may apply filtering to a coding unit on the basis of information indicating whether 1 ALF is applied, information of an ALF coefficient, etc. which are provided by the encoder. The ALF information may be inserted into a specific parameter so as to be signaled.

The memory 245 stores reconstructed pictures or blocks so that the reconstructed pictures or blocks can be used as reference pictures or blocks, or feeds them to an output unit.

Herein below, a CABAC encoding method and apparatus and a CABAC decoding method and apparatus according to embodiments of the present invention will be described with reference to FIGS. 3 to 7. In various embodiments described in herein, the term "parallelization unit" refers to a set of one or more coding units constituting one picture, which is created for parallel processing during video encoding and decoding. Here, the term "coding unit" collectively refers to a coding unit which can be partitioned into sub-coding units based on a tree structure and a coding unit which cannot be further partitioned.

Figure 3:
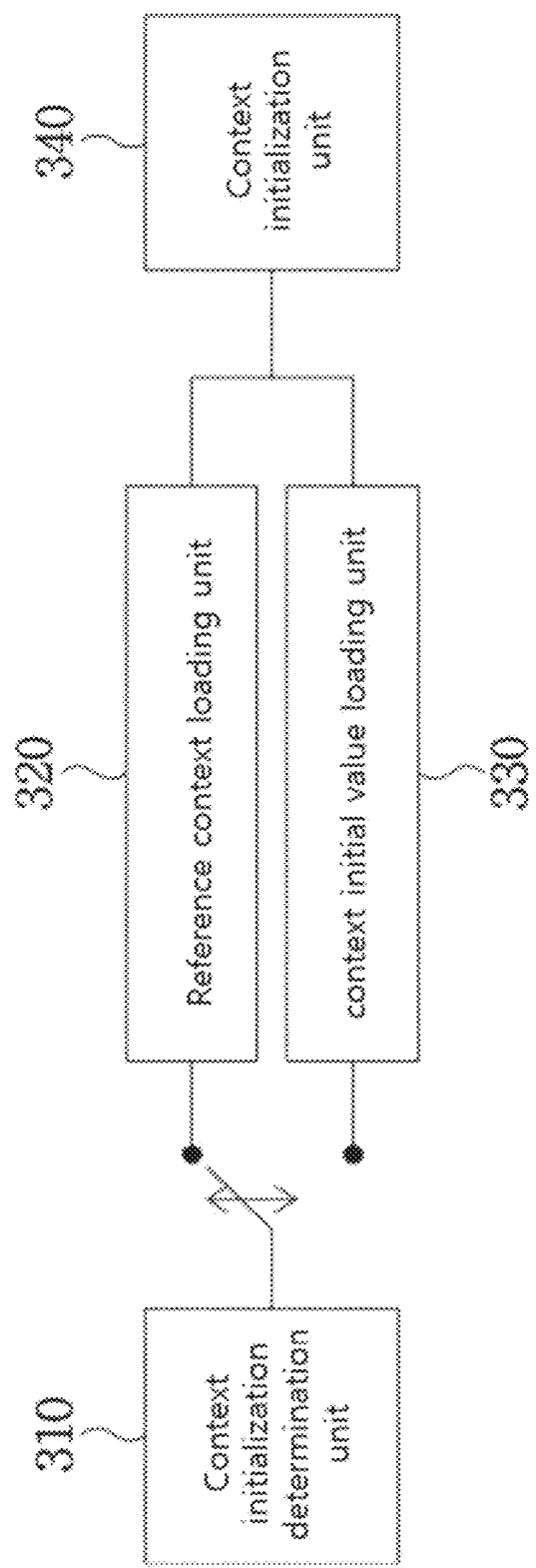
FIG. 3 is a schematic view illustrating the configuration of a CABAC context encoding/decoding apparatus for adaptively initializing a CABAC context model, according to one application example of the present invention.

FIG. 3 is a schematic view illustrating the configuration of a CABAC encoding/decoding apparatus for adaptively initializing a CABAC context model, according to one embodiment to which the present invention is applied.

Referring to FIG. 3, the CABAC encoding/decoding apparatus according to one embodiment of the present invention may include a context initialization determination unit 310, a reference context loading unit 320, and a context initial value loading unit 330 or a context initialization unit 340.

The context initialization determination unit 310 may determine whether adaptively initializing a CABAC context model is to be performed, based on information indicating whether adaptive initialization of a CABAC context model has been performed. The information indicating the result of the determination of whether the adaptive initialization of a CABAC context model is to be performed may be encoded into a flag form or the like in the video encoding apparatus. The information may include a specific value indicating the state of a reference CABAC context. The information may be inserted into a high-level syntax of a bit-stream so as to be signaled to the video decoding apparatus. For example, the information may be inserted into at least one of a sequence parameter set and a picture parameter set so as to be signaled. The information may be signaled on a per parallelization unit basis which constitutes a picture. In this way, an independent adaptive initialization of a CABAC context model per parallelization unit may be allowed.

Responding to the information indicating that the CABAC context is adaptively initialized, the reference context loading unit 320 may acquire a reference CABAC context state. The context initialization unit 340 may initialize a CABAC context model on the basis of the acquired reference CABAC context state.

The reference CABAC context state may mean a CABAC context state stored in the previous decoding process. The reference CABAC context state may mean a CABAC context state stored at a specific position within a previously-decoded picture. For example, the reference CABAC context state may be a CABAC context state stored at a specific position within a picture identical to the picture to which the current CABAC context model belongs or within a reference picture at a different point in time. Here, the specific position may mean a position within a parallelization unit which corresponds to the current CABAC context model or within a temporally or spatially adjacent parallelization unit. The specific position may be a fixed position preliminarily agreed between the CABAC encoding apparatus and the CABAC decoding apparatus. The specific position may be identified based on information signaled using a bit-stream. The signaled information may mean information indicating the specific position, which is coded by the CABAC information, information on a reference of the current picture, information on attributes (for example, a partitioning technique, size, shape, depth, etc.) of a block constituting a picture, etc.

When a picture is partitioned into parallelization units (for example, tiles), the reference CABAC context state may mean a CABAC context stage stored at a specific position in a corresponding parallelization unit within a previously decoded picture. The corresponding parallelization unit may be a co-located parallelization unit within a reference picture or a parallelization unit using the same quantization parameter (QP) within a reference picture.

In the case where a picture is partitioned into parallelization units, when the size and/or the number of parallelization units in each of the pictures is the same, the reference CABAC context state may mean a specific position in a co-located parallelization unit in a previously decoded picture.

On the other hand, when the size and/or the number of parallelization units is not same, any one CABAC context state among CABAC context states stored in a previously decoded picture may be selected. The selection may be performed taking into account a difference between the position of the stored CABAC context state and the position of the parallelization unit. For example, a CABAC context state having the smallest difference with the parallelization unit in terms of position may be selected as the reference CABAC context state. In a case where the size and/or the number of parallelization units is not same, a CABAC context state stored in a parallelization unit occupying the largest area within a previously decoded picture may be used as the reference CABAC context state when position information on CABAC context states within the previously decoded picture is mapped on parallelization units.

In the case where a plurality of sub-pictures exists within a picture like a 360-degree video, a CABAC context state stored at a specific position within each sub-picture existing within a picture may be used as a reference CABAC context state.

Figure 4:
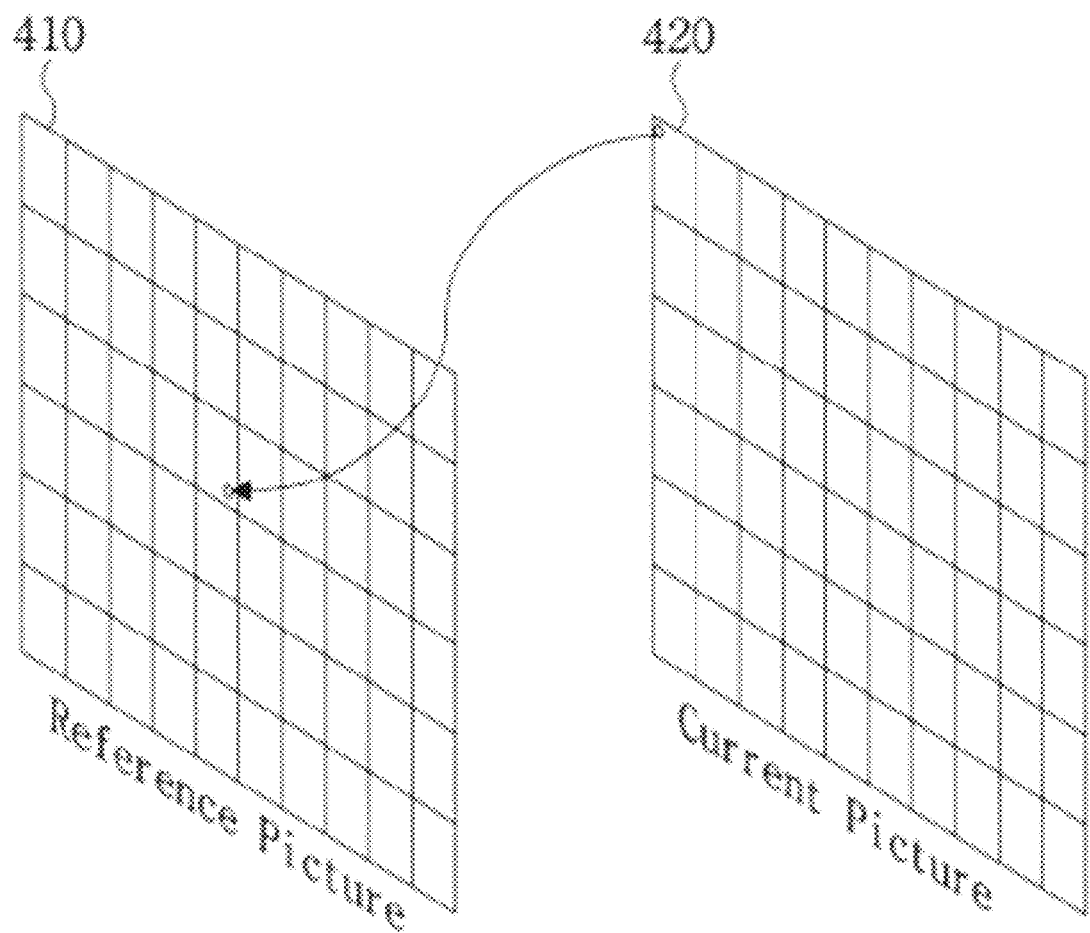
FIG. 4 illustrates a technique of adaptively initializing a CABAC context model, according to one embodiment of the present invention.

FIG. 4 illustrates a technique of adaptively initializing a CABAC context model, according to one embodiment of the present invention.

In FIG. 4, a reference picture 410 may be an encoded/decoded picture (i.e., previously encoded/decoded picture) preceding to a current picture 420 and may mean a picture referred to for initialization of a CABAC context model of the current picture 420. The reference picture 410 may be any one of a plurality of reference pictures which is referred to by the current picture 420 when inter prediction for the current picture 420 is performed. For example, the reference picture 410 may be a reference picture with a predetermined index, which is included in a reference picture list for the current picture. The predetermined index may be a fixed value preset in the CABAC encoding apparatus and the CABAC decoding apparatus. The predetermined index may be a variable value signaled using a bit-stream or derived from a reference picture index of a block included within the current picture 420. A picture having the same quantization parameter (QP) as the current picture 420 may be selected and used as the reference picture 410.

As illustrated in FIG. 4, the current picture 420 may refer to a CABAC context state stored at a specific position within the reference picture 410 for adaptive initialization of the CABAC context model.

The specific position within the reference picture 410 may mean a position of a coding unit, which is preliminarily agreed between the CABAC encoding apparatus and the CABAC decoding apparatus, and information indicating the specific position may not be signaled. The CABAC encoding apparatus may determine the optimum specific position within the reference picture 410 while taking coding efficiency into account, encode the determined optimum specific position, and signal the encoded information to the CABAC decoding apparatus.

The process of referring to the CABAC context state stored at the specific position within the reference picture 410 may include a process of loading a CABAC context state stored at the time of encoding/decoding a block corresponding to the specific position within the reference picture 410.

The process of initializing the CABAC context model of the current picture 420 means initializing the CABAC context state of the start block of the current picture 420, based on the loaded CABAC context state.

Figure 5:
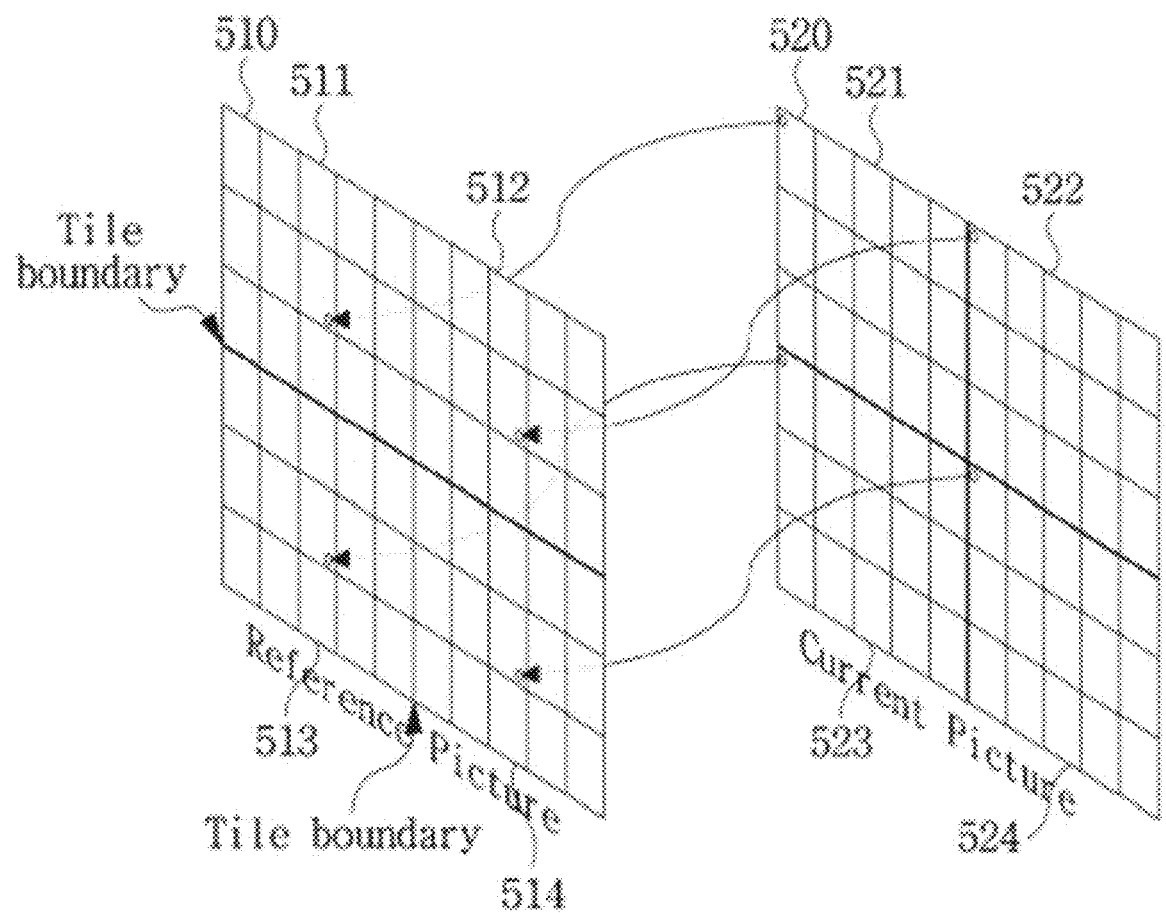
FIG. 5 illustrates a method of adaptively initializing a CABAC context model on a per-parallelization unit basis, according to one application example of the present invention.

FIG. 5 illustrates a method of adaptively initializing a CABAC context model on a per parallelization unit basis, according to one embodiment to which the present invention is applied.

In the present embodiment, for convenience of description, a case where the parallelization unit is a tile will be described as an example. A reference picture illustrated in FIG. 5 has been described in detail with reference to FIG. 4. Therefore, a description thereof will not be duplicated here. As illustrated in FIG. 5, the reference picture 510 is composed of four parallelization units 511, 512, 513, and 514, and a current picture 520 is composed of the same number and size of parallelization units 521, 522, and 523, and 524.

As illustrated in FIG. 5, the parallelization units of the current picture 520 may refer to CABAC context states stored at specific positions in the parallelization units of the reference picture 510 for adaptive initialization of the CABAC context model. In this case, the parallelization unit of the current picture 520 may refer to a parallelization unit located at the same position within the reference picture 510, or may refer to a parallelization unit located at a different position within the reference picture. The parallelization unit at the different position may be a parallelization unit in the reference picture 510, which uses the same quantization parameter (QP) as the parallelization unit in the current picture 520.

The specific position in the parallelization unit may mean a position of a coding unit preset in the CABAC encoding apparatus and the CABAC decoding apparatus, and, in this case, information indicating the specific position may not be signaled. The CABAC encoding apparatus may determine the optimum specific position within each parallelization unit while taking coding efficiency into account, encode the determined optimum specific position, and signal the encoded information to the CABAC decoding apparatus.

The process of referring to the CABAC context state stored at the specific position within the reference picture 510 may include a process of loading a CABAC context state stored at the time of encoding/decoding a block corresponding to the specific position in the parallelization unit within the reference picture 510.

The process of initializing the CABAC context model of each parallelization unit of the current picture 520 means initializing the CABAC context state of the start block of each of the parallelization units which belong to the current picture 520, based on the loaded CABAC context state.

Figure 6:
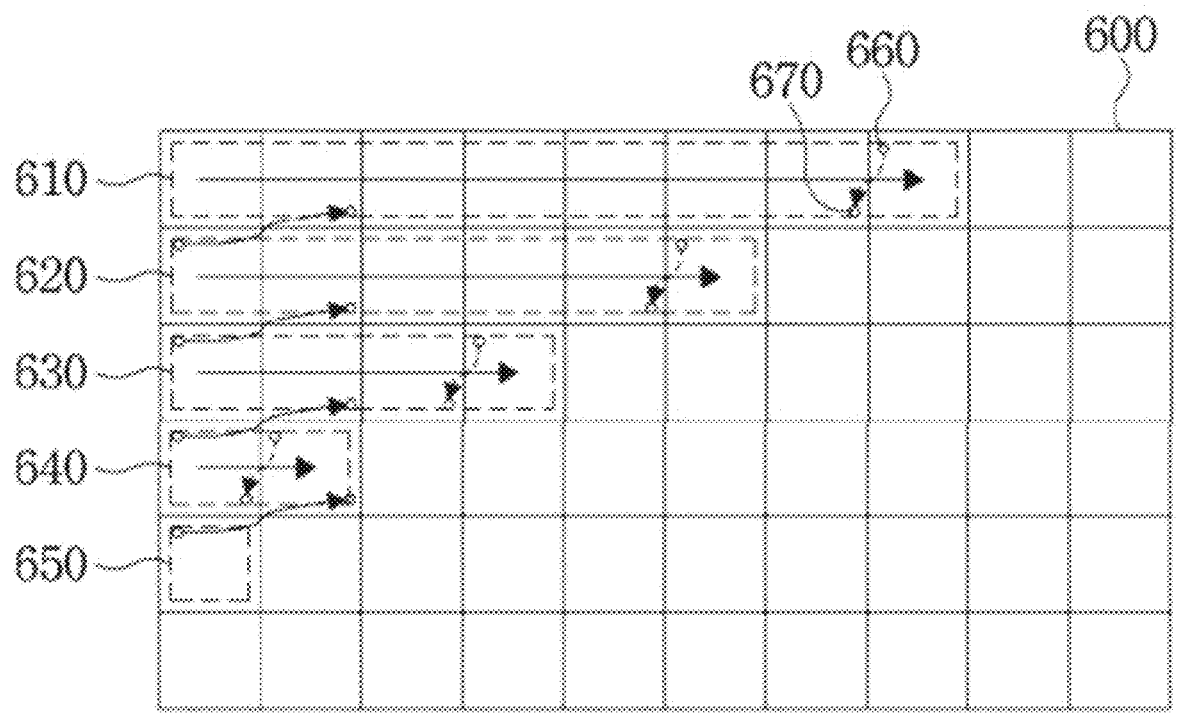
FIGS. 6 and 7 illustrate a parallel processing-based CABAC context model initialization method according to one application example of the present invention.
Figure 7:
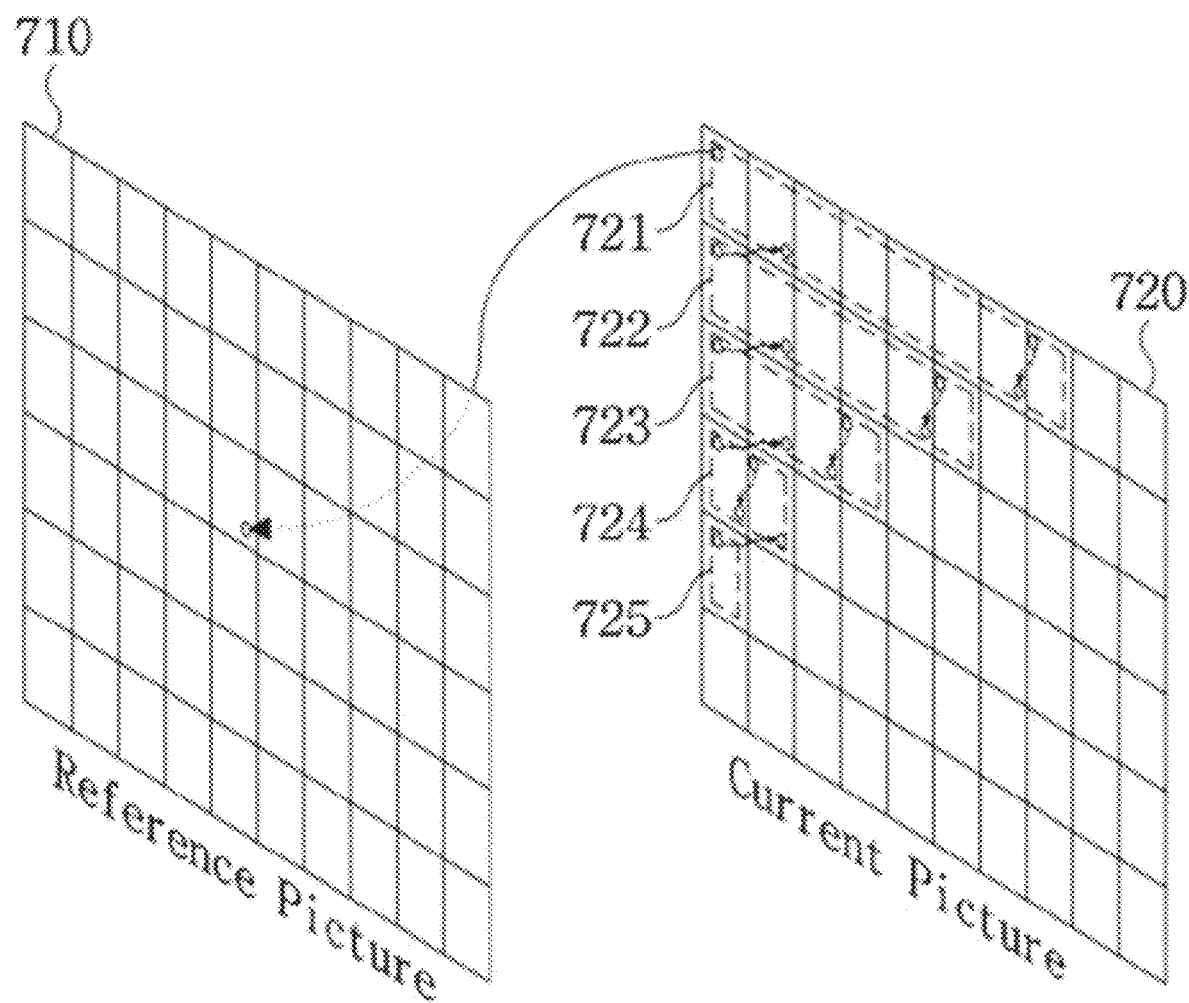

FIGS. 6 and 7 illustrate a parallel processing-based CABAC context model initialization method according to one embodiment to which the present invention is applied.

Referring to FIG. 6, the parallel processing-based CABAC context model initialization method according to the present embodiment initializes a CABAC context model for each of the block lines 610, 620, 630, 640, and 650, and may initialize a CABAC context model of a first block of one block line of the block lines by referring to the CABAC context state of a second block of a previous block line. Here, a block may mean a coding unit, and may specifically denote a coding tree block (CTB), a coding block generated through tree structure partitioning, or a smallest coding block (SCU).

Referring to FIG. 7, a current picture 720 refers to a CABAC context state stored at a specific position in a reference picture 710 and initializes a CABAC context model for a first block line 721 of the current picture 720. Initialization of CABAC context models of the other block lines than the first block line of the current picture 720 may be performed by referring to a previous block line as having been described with reference to FIG. 6. In some cases, initialization of a CABAC context model of at least one of the other block lines 722, 723, 724, and 725 may be performed by referring to the CABAC context state stored at the specific position in the reference picture 710. Here, the specific position (hereinafter, referred to as a first specific position) in the reference picture 710 referred to by a block line 821 may be the same as or may be different from the specific position (hereinafter, referred to as a second specific position) in the reference picture 710 referred to by at least one of the other block lines.

The specific position may be variable positions determined according to the position of each of the block lines included in the current picture 720 or fixed positions allocated to the respective block lines.

The specific position may be a fixed position preset in the CABAC encoding apparatus and the CABAC decoding apparatus. The specific position may be identified based on information signaled using a bit-stream. The signaled information may include information indicating the specific position, which is encoded by the CABAC information, information on a reference of the current picture, information on attributes (for example, a partitioning technique, size, shape, depth, etc.) of a block constituting a picture, etc.

Herein below, a method of performing inter prediction based on motion vector refinement, which is performed by the inter prediction unit, will be described with reference to FIG. 11.

The inter prediction unit may determine a motion vector of a current block on the basis of a predetermined inter mode (for example, a skip mode, a merge mode, and an AMVP mode), and perform inter prediction using the determined motion vector. The determined motion vector may be used as it is or may be used after being refined based on motion vector refinement information.

Here, the motion vector refinement information may include at least one of refinement ON/OFF information, refinement repeat/non-repeat information, the number of times that the refinement is repeated, information on a resolution of a motion vector, information on an allowable refinement range, motion vector refinement signaling information, and information on a block, slice, and picture which is referred to for refinement of a motion vector.

The motion vector may be selectively refined based on the refinement ON/OFF information. The refinement ON/OFF information may be information indicating whether a motion vector is to be refined or not and may be represented in the form of a flag. The motion vector may be refined at a resolution indicated by the information on the resolution of a motion vector. Possible resolution candidates may include integer pels and sub-pels such as a 1/2 pel, a 1/4 pel, a 1/8 pel, and a 1/16 pel, and the motion vector resolution information may specify at least one of the possible resolution candidates. The information on an allowable refinement range may mean a resolution range within which refinement is allowed, a block range on which motion vector refinement is performed, etc.

The motion vector refinement information may be signaled using a bit-stream, and at least one piece of the motion vector refinement information may be derived from spatially neighboring blocks (for example, a left neighboring block, an upper neighboring block, a top left neighboring block, a bottom left neighboring block, a top right neighboring block, etc.) and/or temporally neighboring blocks. In addition, at least one piece of the motion vector refinement information may be fixed information preset in the video encoding apparatus and the video decoding apparatus or variable information determined according to attributes of the current block (for example, an inter prediction type, whether to perform bidirectional prediction, whether to use a near-distance reference picture, the size/shape/depth of a block, a partitioning technique, whether a residual coefficient exists or not, a quantization parameter, etc.). The motion vector refinement information may be signaled or derived at any level among various levels including a sequence level, a picture level, a slice level, a tile level, a block level (for example, a coding block level, a prediction block level, etc.) according settings preset in the video encoding apparatus and the video decoding apparatus or according to the characteristics of information. In some cases, at least one piece of the motion vector refinement information may not be signaled according to settings preset in the video encoding apparatus and the video decoding apparatus. For example, when the size of the current block satisfies a predetermined condition and the bidirectional prediction is performed for the current block, the motion vector refinement is performed. The predetermined condition means that the vertical or horizontal size of the current block is equal to or larger than a predetermined size or the area of the current block is equal to or larger than a predetermined area.

In a case where a prediction block of the current block is generated using inter prediction, motion vectors may be stored in the video encoding/decoding apparatus, and in this case the video encoding/decoding apparatus may be equipped with a dedicated buffer for storing the motion vectors.

The motion vector refinement according to the present invention is described for a case where the refinement is applied to a reconstructed motion vector. However, the present invention is not limited thereto, and it is of course possible to apply the same or similar refinement process to a predicted motion vector.

Figure 8:
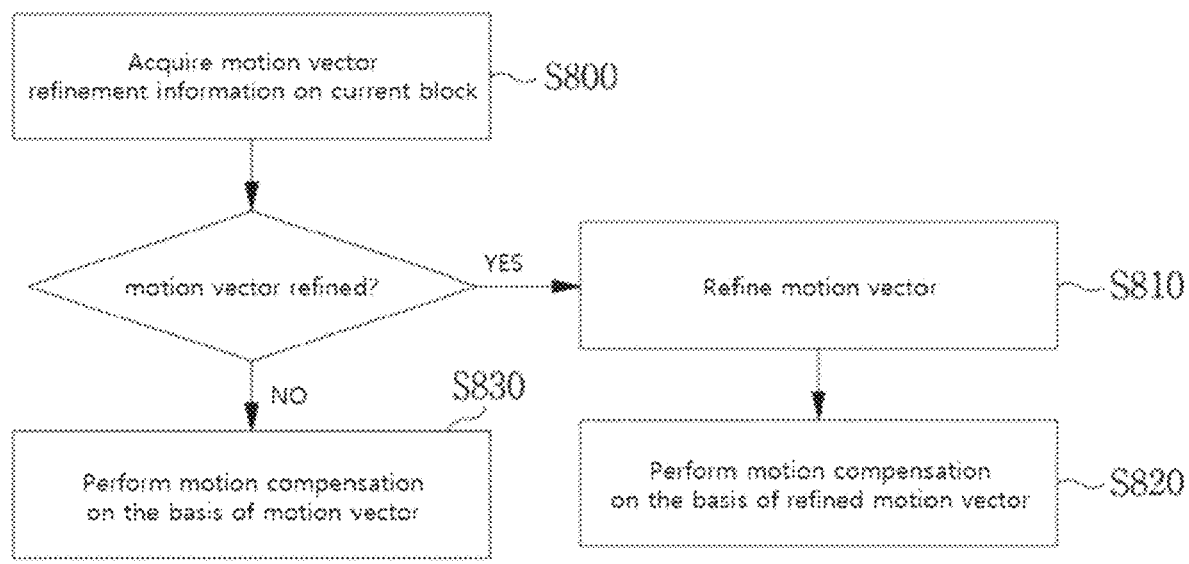
FIG. 8 illustrates a process of performing inter prediction by selectively refining some motion vectors, according to one application example of the present invention.

FIG. 8 illustrates a process of performing inter prediction by selectively refining some motion vectors, according to one embodiment to which the present invention is applied.

Referring to FIG. 8, motion vector refinement information on a current block may be acquired (S800). Here, the motion vector refinement information is the same as described above. That is, the motion vector refinement information may include at least one of refinement ON/OFF information, information on the number of times that the refinement is repeated, information on a resolution of a motion vector, information on an allowable refinement range, motion vector refinement signaling information, and information on a block, slice, and picture which is referred to for refinement of a motion vector. That is, at least one piece of the motion vector refinement information may be acquired.

When the refinement ON/OFF information indicates that a motion vector is to be refined, a motion vector may be refined (S810).

The motion vector refinement may be performed at the same resolution as the motion vector refinement performed in the video encoding apparatus, or at a different resolution from the motion vector refinement performed in the video encoding apparatus. That is, a higher resolution or a lower resolution than that used in the video encoding apparatus can be used. For example, the video encoding apparatus may encode and signal a motion vector on a per integer-pel basis and the video decoding apparatus may refine the motion vector on a per sub-pel basis (for example, on a per 1/2-pel, 1/4-pel, 1/8-pel, 1/16-pel basis). Information on refinement on a finer sub-pixel basis may be included within the motion vector refinement information.

The motion vector may be refined using a previously decoded predicted/reconstructed value. The previously decoded predicted/reconstructed value may be a predicted/reconstructed value of the current block, which is obtained by performing inter prediction on the basis of the motion vector of the current block which is a refinement target, or a predicted/reconstructed value of a reference picture referred to by the current block. The previously decoded predicted/reconstructed value may be a predicted/reconstructed value of a neighboring block temporally and/or spatially adjacent to the current block.

The motion vector refinement according to the present invention may include a process of calculating an offset vector used to compensate for an error of the motion vector by using the previously decoded predicted/reconstructed value. In this case, the refined motion vector may be derived based on a pre-refined motion vector (original motion vector) and a calculated offset vector. For example, the previously decoded predicted/reconstructed value is obtained by using a motion vector to be refined and an offset vector candidate of the current block. More specifically, the previously decoded predicted/reconstructed value is obtained by using a vector derived by summing the motion vector (refinement target) and the offset vector candidate. That is, the refined motion vector is derived by summing the offset vector and the motion vector before refinement. The offset of the offset vector is a value pre-defined in the image encoding/decoding apparatus or is a value that is signaled.

Next, inter prediction is performed again based on the refined motion vector to acquire a predicted/reconstructed value of the current block (S820).

As described above, the refined motion vector or the motion vector before the refinement may be stored in the buffer provided in the video encoding/decoding apparatus and then may be used to determine a motion vector of a neighboring block and/or a picture which is to be subsequently encoded/decoded. For example, the refined motion vector is used to determine a motion vector of a picture to be subsequently encoded/decoded, and the motion vector before the refinement is used to determine a motion vector of a neighboring block to be subsequently encoded/decoded.

On the other r hand, when the refinement ON/OFF information indicates that the motion vector is not to be refined, the motion vector is used as it is for inter prediction of the current block without being refined (S830).

The motion vector refinement may be repeated by a predetermined number of times. The number of times that the motion vector refinement is repeated may be determined according to the information on the number of times that the refinement is performed. The information on the number of times that the refinement is performed may be signaled using a bit-stream. However, in a case where the video encoding apparatus and the video decoding apparatus have preliminarily agreed on the number of times of refinement and thus it is known when to stop the motion vector refinement, the information on the number of times of refinement may not be signaled. When the motion vector refinement is repeatedly performed, only the last motion vector may be stored, and at least one of motion vectors acquired through repeated refinement operations may be repeatedly stored in the buffer of the video encoding/decoding apparatus.

Figure 9:
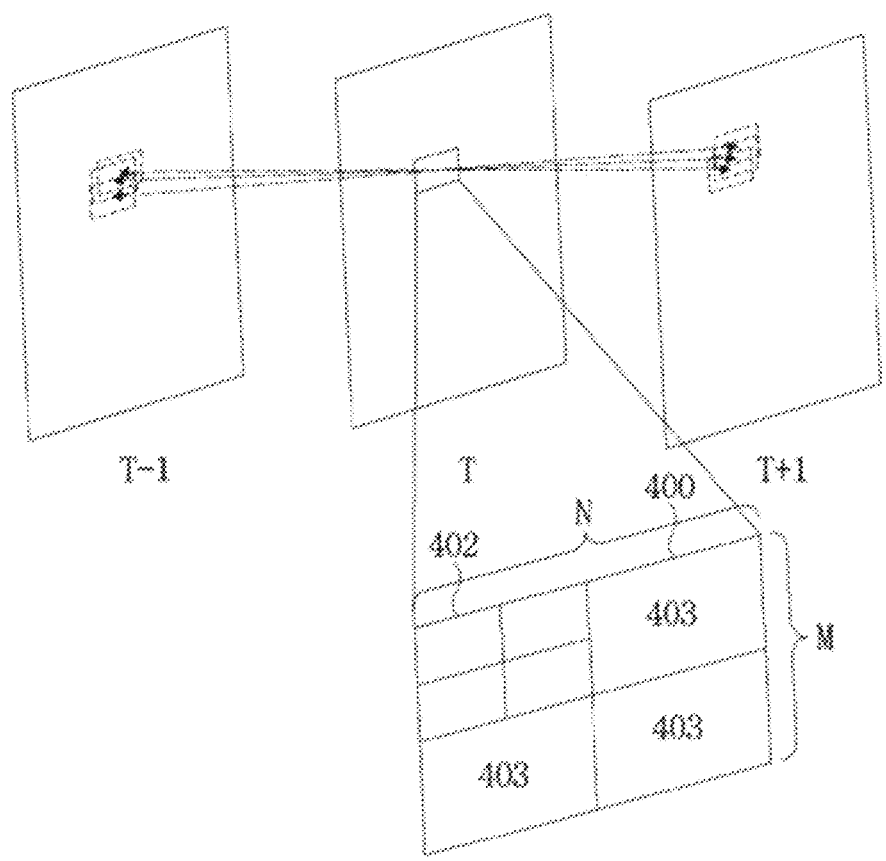
FIG. 9 illustrates an example in which a block size is changed in a process of refining a motion vector when motion vector refinement is repeatedly performed, according to the embodiment of FIG. 8.

FIG. 9 illustrates an example in which a block is changed in a process of refining a motion vector when motion vector refinement is repeatedly performed in the embodiment of FIG. 8.

The motion vector refinement is repeatedly performed for the current block having an N×M size (here, N and M may be an equal number or different numbers), the size of the block on which the motion vector refinement is performed may be changed to be like a block 400 illustrated in FIG. 4, according to the number of times of refinement.

Referring to FIG. 9, the refinement may be performed for a block size of N/2×M/2 at a first refinement step, performed for a block size of N/4×M/4 within a top left block 402 at a second refinement step, and performed for the other blocks 403 having the same size.

Information on whether the motion vector refinement is to be performed for the same size blocks (the blocks which are not partitioned) using a previously processed block may also be included in the motion vector refinement information.

Figure 10:
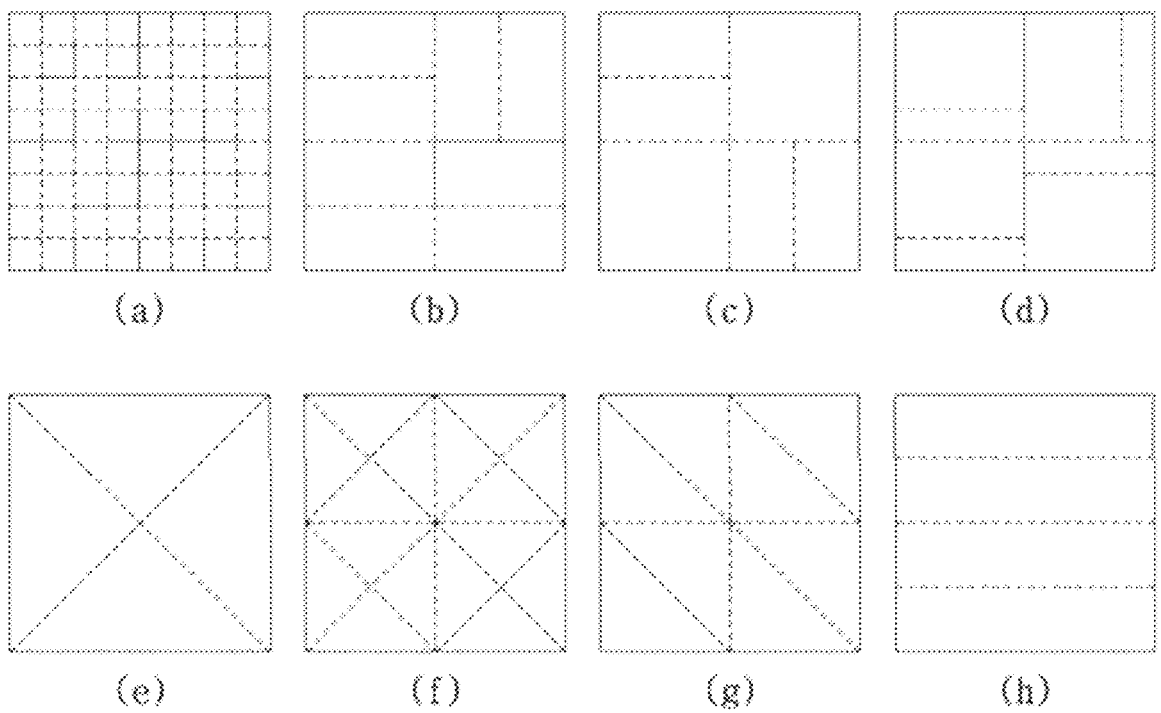
FIG. 10 illustrates the sizes and shapes of blocks resulting from partitioning which is performed to support repeated motion vector refinements, according to one application example of the present invention.

FIG. 10 illustrates the sizes and shapes of blocks resulting from partitioning which is performed to support repeated motion vector refinements, according to one embodiment to which the present invention is applied.

As illustrated in FIG. 10(a), a block may be partitioned into sub-blocks having an equal size according to a partition depth. As illustrated in FIG. 10(b), a block may be partitioned into non-square sub-blocks. As illustrated in FIG. 10(c), some blocks may be partitioned by a depth different from a partition depth of the other blocks. As illustrated in FIG. 10(d), partitioning may result in asymmetric sub-blocks. As illustrated in FIGS. 10(e), 10(f), and 10(g), partitioning may result in non-rectangular sub-blocks in which triangular or rectangular sub-blocks may be mixed. As illustrated in FIG. 10(h), a block may be partitioned horizontally by three horizontal lines to produce four non-square blocks having an equal size. FIGS. 10(a) to 10(h) illustrate some of possible embodiments of the present invention. That is, a block may be partitioned into sub-blocks having various sizes and shapes and information on the sizes and shapes of the sub-blocks may be included in the motion vector refinement information.

The smallest unit up to which the partitioning is allowed may be a single pixel. Blocks which are partially or entirely identical in terms of the motion vector refinement information thereof may be merged. Even in the case where an original coding unit does not have a rectangular shape, the coding unit may be partitioned into sub-blocks having various shapes as illustrated in the embodiment of FIG. 10. As illustrated in FIG. 9, one reference picture, two reference pictures, three reference pictures, or a greater number of reference pictures may be used for the motion vector refinement. In the case where the motion vector refinement is repeatedly performed, a reference picture may be changed, and accordingly a method of acquiring motion vector refinement information from a reference picture may be changed.

When a block is partitioned into sub-blocks having various shapes as illustrated in FIG. 10, the blocks may have different motion vectors. In this case, artifacts may occur between blocks having different motion vectors. In order to eliminate the artifacts, in-loop filtering may be applied which will be described with reference to FIGS. 17 to 19.

Figure 11:
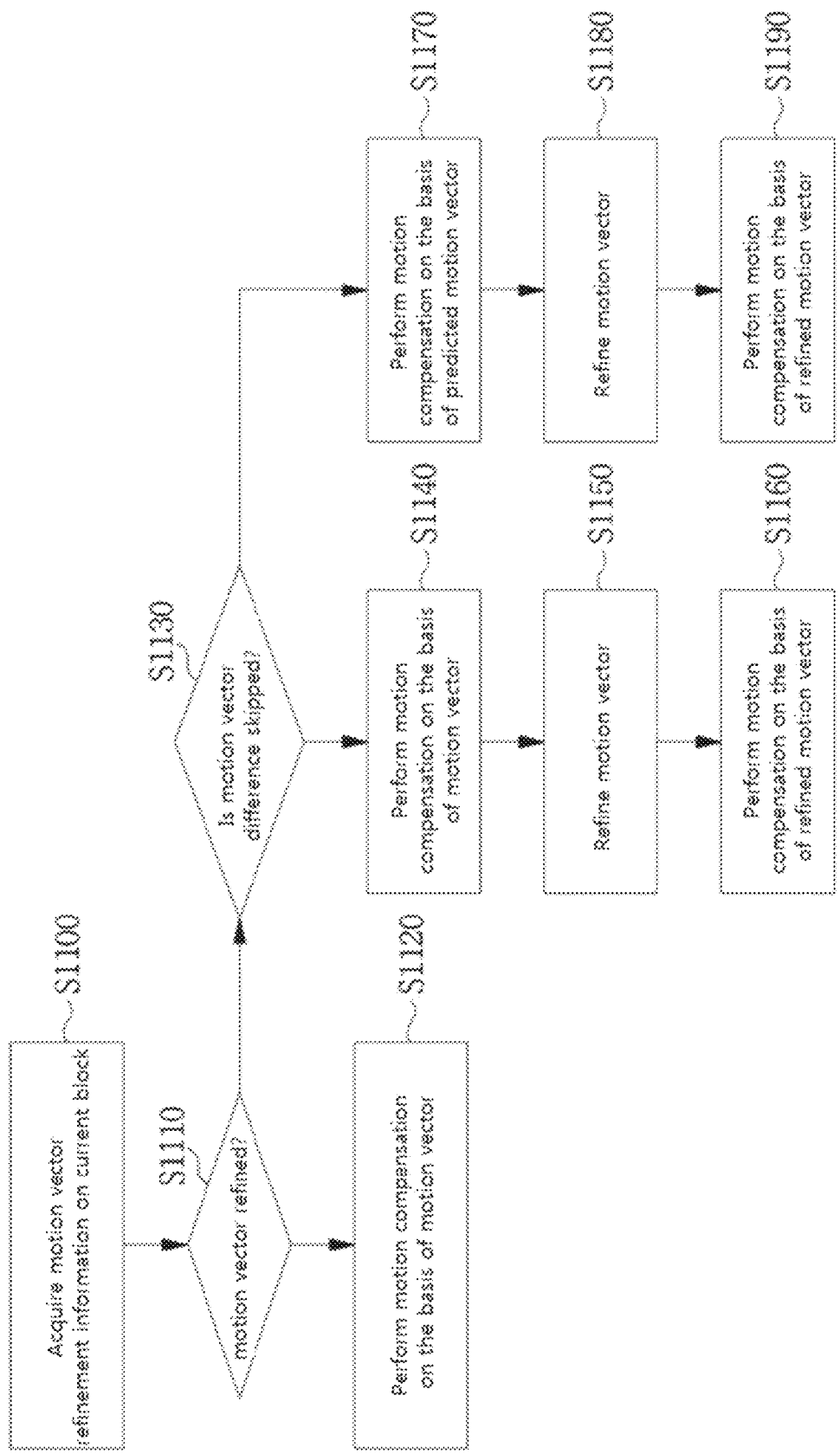
FIG. 11 is illustrates a process of performing inter prediction by selectively signaling a motion vector difference, according to one application example of the present invention.

FIG. 11 is illustrates a process of performing inter prediction by selectively signaling a motion vector difference, according to one embodiment to which the present invention is applied.

A motion vector can be modified through motion vector refinement. When an offset vector becomes the same as a motion vector difference (MVD) calculated through the process, the decoding of the current block can be performed without signaling the MVD. That is, when it is determined that the motion vector is not modified through the motion vector refinement, signaling of the motion vector difference can be skipped, resulting in improvement in a coding efficiency.

For selective signaling of the motion vector differences, information indicating whether signaling of the motion vector difference is skipped may be used. The information may be signaled using a bit-stream or may be derived from a specific value determined while taking attributes of a block into account. For example, when the value of the information is a first value, the motion vector difference for the current block may not be signaled. In this case, the motion vector difference may be substituted by an offset vector calculated through the motion vector refinement. On the other hand, when the value of the information is a second value, the motion vector difference may be signaled using a bit-stream.

The information may be signaled at any level of various levels including a sequence level, a picture level, a slice level, and a block level or signaling thereof may be skipped depending on conditions that are preset in the video encoding apparatus and the video decoding apparatus. For example, in a case where there is an agreement that a motion vector difference is signaled when a motion vector refinement for a current block is not performed, the information may not be signaled.

Referring to FIG. 11, motion vector refinement information may be acquired (S1100). Since the motion vector refinement information is the same as one that has been described above, a description thereof will not be duplicated here.

Based on the motion vector refinement information acquired in S1100, whether to refine a motion vector of a current block may be determined (S1110).

When the refinement ON/OFF information indicates that the motion vector of the current block is not to be refined, motion compensation may be performed based on a motion vector derived from the sum of a predicted motion vector and a motion vector difference (S1120).

On the other hand, when the refinement ON/OFF information indicates that the motion vector of the current block is to be refined, whether to skip signaling the motion vector difference of the current block will be determined (S1130). Whether to skip signaling of the motion vector difference may be determined using flag a predetermined (for example, mvd_skip_flag).

When it is determined that signaling of the motion vector difference is to be performed, the motion compensation may be performed based on a motion vector derived from the sum of the predicted motion vector and the motion vector difference (S1140). The motion vector derived in S1140 may be refined using a predicted/reconstructed value acquired through the motion compensation (S1150). That is, an offset vector for compensating for an error of the motion vector may be derived using the predicted/reconstructed value acquired through the motion compensation. A refined motion vector can be acquired by adding the derived offset vector to the motion vector. Motion compensation may be performed using the refined motion vector (S1160).

On the other hand, when it is determined that signaling of the motion vector difference is to be skipped, the motion compensation may be performed based on a predicted motion vector PMV (S1170). Similarly, the predicted motion vector acquired in S1170 may be refined using the predicted/reconstructed value acquired through the motion compensation (S1180). That is, an offset vector for compensating for an error of the predicted motion vector PMV may be derived using the predicted/reconstructed value acquired through the motion compensation. A refined motion vector can be acquired by adding the derived offset vector to the predicted motion vector PMV. Motion compensation may be performed based on the refined motion vector (S1190).

The motion vector refinement may be repeated by predetermined number of times as illustrated in the embodiment of FIG. 11 and described below with reference to FIGS. 8 to 10.

Figure 12:
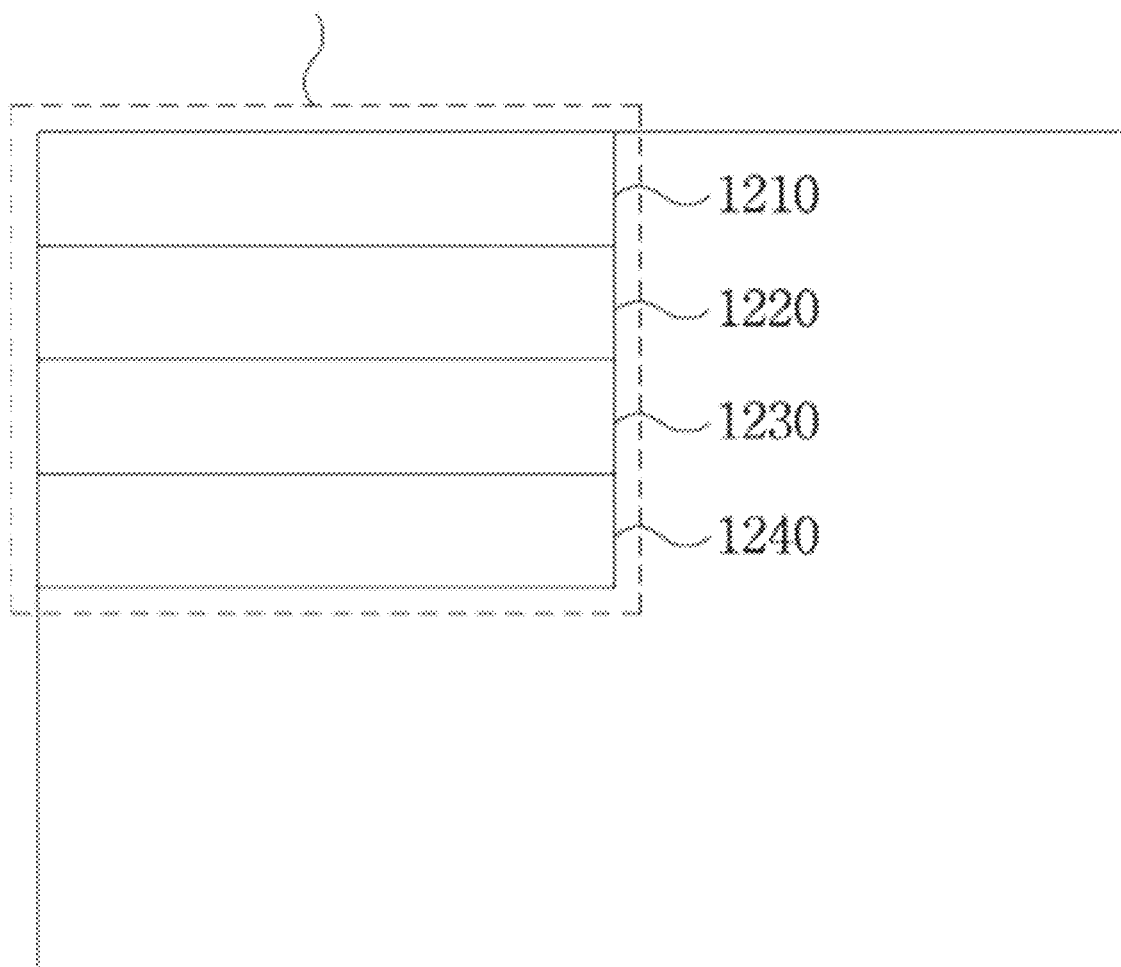
FIG. 12 illustrates a unidirectional intra prediction method performed on a per sub-block basis according to one application example of the present invention.
Figure 13:
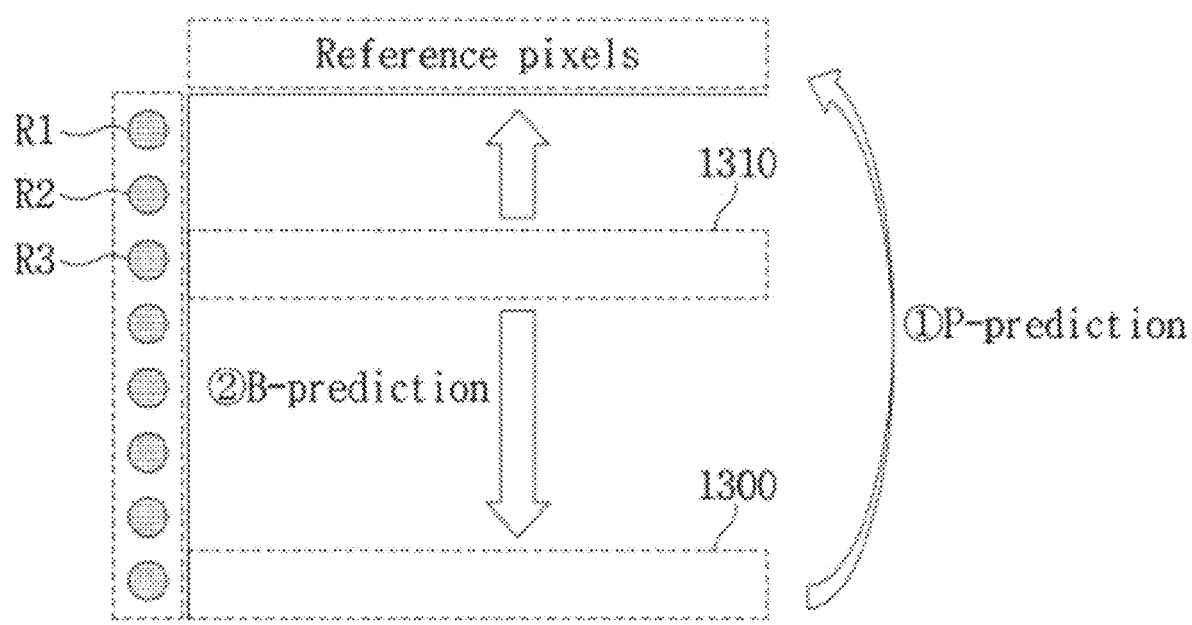
FIG. 13 illustrates a bidirectional intra prediction method performed on a per sub-block basis according to one application example of the present invention.

Referring to FIGS. 12 to 13, an intra prediction method on a per sub-block basis will be described.

FIG. 12 illustrates a unidirectional intra prediction method on a per sub-block basis, according to one embodiment to which the present invention is applied.

Referring to FIG. 12, a current block may include n sub-blocks. Here, the current block may refer to a coding block or a prediction block. The current block may mean a block unit to which an intra prediction mode is applied. Here, n is a natural number, in which n may be a fixed value preset in the video encoding apparatus and the video decoding apparatus or a variable value determined according to the attributes of a block. The attribute of a block refers to the result of comparison between the horizontal and/or vertical size of a block and a predetermined threshold value. Alternatively, the video encoding apparatus may determine the optimum value of n, encode the value, and signal the encoded value. The video decoding apparatus may determine the value of n on the basis of the signaled information.

The sub-block has an N×M size, in which N and M are 1, 2, or a greater natural number, and N and M may be the same number or different numbers. The sub-block may be composed of one pixel, may be represented pixel groups having a square or non-square shape, or in pixel lines (rows and columns). The size of the sub-block may be a fixed size preset in the video encoding apparatus and the video decoding apparatus or a variable size determined according to the attributes of the block. For example, the size of the sub-block may be fixed including at least 16 samples. The size/shape of the sub-block may be determined, taking into account directionality of an intra prediction mode of the current block. For example, when the intra prediction mode has a horizontal directionality, the sub-block may have a rectangular shape where M is greater than N. On the other hand, when the intra prediction mode has a vertical directionality, the sub-block has a rectangular shape where N is greater than M. The video encoding apparatus may encode and signal the optimum size of the sub-block, and the video decoding apparatus may determine the size of the sub-block on the basis of the signaled information. The information may be signaled at least one level among a sequence level, a picture level, a slice level, a tile level, and a block level. For example, the direction in which the current block is divided into n sub-blocks is signaled at the block level.

In the unidirectional intra prediction method according to the present invention, intra prediction and reconstruction of a first sub-block 1210 located at a top row in the current block may be performed, based on neighboring pixels adjacent to the current block and intra prediction modes. A second sub-block 1220 may be intra-predicted and reconstructed using neighboring pixels and/or pixels in the reconstructed first sub-block. In this manner, the other sub-blocks 1230 and 1240 can also be intra-predicted and reconstructed. In this case, the accuracy of the intra prediction can be improved and energy of a residual error can be reduced. However, the embodiment of FIG. 12 is not intended to limit the prediction and reconstruction order of the sub-blocks. That is, prediction and reconstruction on sub-blocks may be sequentially performed in order of a fourth sub-block, a third sub-block, a second sub-block and a first sub-block. According to the sizes/shapes of sub-blocks, the sub-blocks sequentially undergo the prediction and reconstruction in order from a left sub-block to a right sub-block or from the right sub-block to the left sub-block. The prediction and reconstruction order may be determined depending on the intra prediction mode of the current block and/or the intra prediction modes of neighboring blocks. For example, the direction of the intra prediction mode is a direction from top to bottom, the prediction and reconstruction may be performed in order of the first sub-block, the second sub-block, the third sub-block, and the fourth sub-block. On the other hand, the direction of the intra prediction mode is a direction from bottom to top, the prediction and reconstruction order may be performed in order of the fourth sub-block, the third sub-block, the second sub-block, and the first sub-block. The prediction and reconstruction order may be a fixed order preset in the video encoding apparatus and the video decoding apparatus.

FIG. 13 illustrates a bidirectional intra prediction method on a per sub-block basis, according one embodiment to which the present invention is applied.

Referring to FIG. 13, a predicted value may be acquired by performing intra prediction on a first sub-block 1300 on the basis of reference pixels of the current block, and the current block may be reconstructed by adding a residual value to a predicted value. Here, the first sub-block 1300 may be a sub-block located at the bottom of the current block, a sub-block located at the right end of the current block, or a sub-block located at the center of the current block. However, the present invention is not limited thereto. The first sub-block 1300 may be a plurality of sub-blocks constituting the current block. The first sub-block 1300 may be defined as a predicted and reconstructed block for the first time among the multiple sub-blocks constituting the current block.

Next, a second sub-block 1310 may be predicted for the second time using at least one of a reference pixel of the current block and a pixel in the reconstructed first sub-block. That is, like the first sub-block 1300, the second sub-block 1310 may be predicted using only a reference picture of the current block or only a pixel in the reconstructed first sub-block. The second sub-block 1310 may be predicted and reconstructed using bidirectional prediction, that is, a first direction prediction and a second direction prediction. Here, the first direction prediction may mean prediction based on a reference pixel of the current block and the second direction prediction may mean prediction based on a pixel within the reconstructed first sub-block. Depending on the shape of the sub-blocks, the first direction may mean an upward vertical direction, and the second direction may mean a downward vertical direction. Alternatively, the first direction may mean a leftward horizontal direction and the second direction may mean a rightward horizontal direction.

As illustrated in FIG. 13, the first direction and the second direction may be different directions or may be the same direction.

The first direction prediction and the second direction prediction may be performed using the same intra prediction mode. Alternatively, the first direction prediction and the second direction prediction may be performed using different intra prediction modes. An intra prediction mode (hereinafter, referred to as a second intra prediction mode) used for the second direction prediction may be derived on the basis of an intra prediction mode (hereinafter, referred to as a first intra prediction mode) used for the first direction prediction. For example, the second intra prediction mode may be derived by adding or subtracting a predetermined constant to or from the value of the first intra prediction mode. The second intra prediction mode may be derived as a mode corresponding to the opposite direction to the first intra prediction mode.

The first direction prediction may be performed based on an encoded intra prediction mode, and the second direction prediction may be performed based on a default mode. The default mode is an intra prediction mode which is preset in the video encoding apparatus and the video decoding apparatus, and may be any one of planar mode, DC mode, and vertical/horizontal mode. The default mode may be determined according to the size/shape of the sub-block. Alternatively, a specific mode may be fixed, regardless of the size/shape of the sub-block. Further alternatively, the default mode can be determined depending on the direction in which a block is divided.

Multiple sub-blocks of the current block are sequentially predicted and/or reconstructed according to a predetermined patterned prediction order. To this end, the video encoding apparatus may determine a patterned prediction order, and may signal information on the patterned prediction order. The video decoding apparatus may sequentially predict and/or reconstruct sub-blocks according to a predetermined order by referring to the signaled information.

Alternatively, the video decoding apparatus may determine the prediction order of sub-blocks, based on values of neighboring reference pixels, an amount of change in the values of neighboring reference pixels, coding information of neighboring blocks, etc. The amount of change may be calculated using multiple reference pixels, and in this case the number of reference pixels may be two, three, four, or more. The multiple reference pixels may be arranged consecutively or intermittently at a predetermined interval (for example, an interval of one pixel, two pixels, or more pixels).

For example, prediction and/or reconstruction for sub-blocks may be performed in decreasing order of pixel value differences D of reference pixels. The pixel value difference D with respect to an R2 reference pixel may be calculated according to Equation 1.

$$D=|R2-R1|+|R2-R3| \qquad \text{[Equation 1]}$$

The pixel value difference D may be calculated for each reference pixel in this way and sub-blocks may be predicted and/or reconstructed in order of from the maximum difference to the minimum difference. Sub-blocks may be predicted and/or reconstructed sequentially in order of from a sub-block corresponding to a reference pixel having the maximum difference Dmax to a sub-block corresponding to a reference pixel having the minimum difference Dmin.

The prediction order may be determined to be from left to right, from right to left, from top to bottom, or from bottom to top, according to the sizes/shapes of the sub-blocks. The prediction order may be determined depending on the intra prediction mode of the current block and/or the intra prediction modes of neighboring blocks. For example, when the direction of the intra prediction mode is a direction from top to bottom, the prediction and reconstruction may be performed in order of the first sub-block, the second sub-block, the third sub-block, and the fourth sub-block. On the other hand, since the direction of the intra prediction mode is a direction from bottom to top, the prediction and reconstruction may be performed in order of the fourth sub-block, the third sub-block, the second sub-block, and the first sub-block. The prediction and reconstruction order may be a fixed order preset in the video encoding apparatus and the video decoding apparatus. For example, in the case of horizontal division as illustrated in FIG. 12, the prediction is performed in the order from the upper end to the lower. On the other hand, in the case of vertical division, the prediction is performed in the order from the right end to the left end.

Herein below, a method of scanning transform coefficients of a transform block will be described with reference to FIGS. 14 to 16.

In the video encoding apparatus, the transform coefficients of the transform block may be scanned based on a predetermined scan type. The transform block may include one or more coefficient groups. Based on the scanning order determined according to the scan type, transform coefficients in a coefficient group may be sequentially scanned and coefficient groups in a transform block may be sequentially scanned.

The coefficient group may have an N×M size. Here, N and M are natural numbers, in which N and M may be the same number or different numbers. In the case where N and M are different numbers, N may be greater than M or less than M. That is, the coefficient group may be a square group or a non-square group. The size/shape of the coefficient group may be a fixed size/shape present in the video encoding apparatus or a variable size/shape determined according to the size/shape of the transform block. The video encoding apparatus may determine the optimum size/shape of the coefficient group, taking a coding efficiency into account, and may encode the determined size/shape. The scan type may be any one of a diagonal scan, a vertical scan, or a horizontal scan. However, the scan type may not be limited thereto. One or more scan types having a predetermined angle may be added to a list of scan type candidates. The diagonal scan is a scanning method of scanning coefficients from a top right corner to a bottom left corner. The vertical scan is a scanning method of scanning coefficients from bottom to top. The horizontal scan is a scanning method of scanning coefficients from right to left. The scan type may be any one of these.

The scan type may be determined based on at least one of coding block information (for example, a largest/smallest size, a partitioning technique, etc), a size/shape of a transform block, a size/shape of a coefficient group, a prediction mode, intra prediction information (for example, an intra prediction mode value, a directionality, an angle, etc.), and inter prediction information. Alternatively, the video encoding apparatus may determine the optimum scan type among scan type candidates that can be used for scanning a transform block and may encode an index indicating the determined scan type. The scan type candidates include at least one of a diagonal scan, a vertical scan, a horizontal scan, a zigzag scan, and a Z scan. The number and kind of scan types may vary from transform block to transform block and may be determined according to at least one of information on a coding block, the size/shape/depth of a transform block, the size/shape of a coefficient group, a prediction mode, information on intra prediction, and information in inter prediction.

When the size of a transform block is greater than a critical value, coefficients within a portion of the transform block may be set to zero. The size of a transform block may be represented in width, height, the sum of width and height, the number of transform coefficients, or any combination thereof. The predetermined critical value may mean a size (for example, the length of 16 or 32 samples) which is preset in the video encoding apparatus. The portion in which transform coefficients are set to zero may be one or more coefficient rows located at a lower end of the transform block or one or more coefficient columns located at a right end of the transform block. The portion may be determined depending on the critical value. For example, a region outside the size of the critical value within the transform block is specified, and coefficients belong to the corresponding region may be set to zero. For example, for an N×M transform block, when N is greater than a critical value of 64, transform coefficients located on 64 rows and/or columns at an upper end and/or a left end of the transform block are maintained as they are, and the other transform coefficients may be set to zero. When M is greater than the critical value of 64, transform coefficients located on 64 lows and/or columns at an upper end and/or a left end are maintained as they are, and the other transform coefficients may be set to zero. For example, for an N×M transform block, when N is greater than n, the transform coefficients positioned at columns ranging from the first column (leftmost column) to the n-th column are maintained, and the rest coefficients are set to zero. Alternatively, when M is greater than n, the transform coefficients positioned at rows ranging from the first row (uppermost row) to the n-th row are maintained, and the rest coefficients are set to zero. When both N and M are greater than n, the transform coefficients within a n×n block starting from the upper left corner are maintained and the rest coefficients are set to zero. Here, n is 16 or 32.

FIG. 14 illustrates a method of scanning a square transform block, according to one embodiment to which the present invention is applied.

Referring to FIG. 14, an 8×8 transform block consists of four coefficient groups, and transform coefficients in the 8×8 transform block may be scanned on a per group basis. FIG. 14(a) illustrates a diagonal scan of a transform block, in which transform coefficients are scanned in order of a bottom right coefficient group, a top right coefficient group, a bottom left coefficient group, and a top left coefficient group according to a scan order of the diagonal scan type, in which transform coefficients in each group are scanned from a top right end to a bottom left end. FIG. 14(b) illustrates a horizontal scan of a transform block, in which transform coefficients are scanned in order of a bottom right coefficient group, a bottom left coefficient group, a top right coefficient group, and a top left coefficient group according to a scan order of the horizontal scan type, in which transform coefficients in each group are scanned from right to left. FIG. 14(c) illustrates a vertical scan of a transform block, in which transform coefficients are scanned in order of a bottom right coefficient group, a top right coefficient group, a bottom left coefficient group, and a top left coefficient group according to a scan order of the vertical scan type, in which transform coefficients in each group are scanned from bottom to top.

Figure 15:
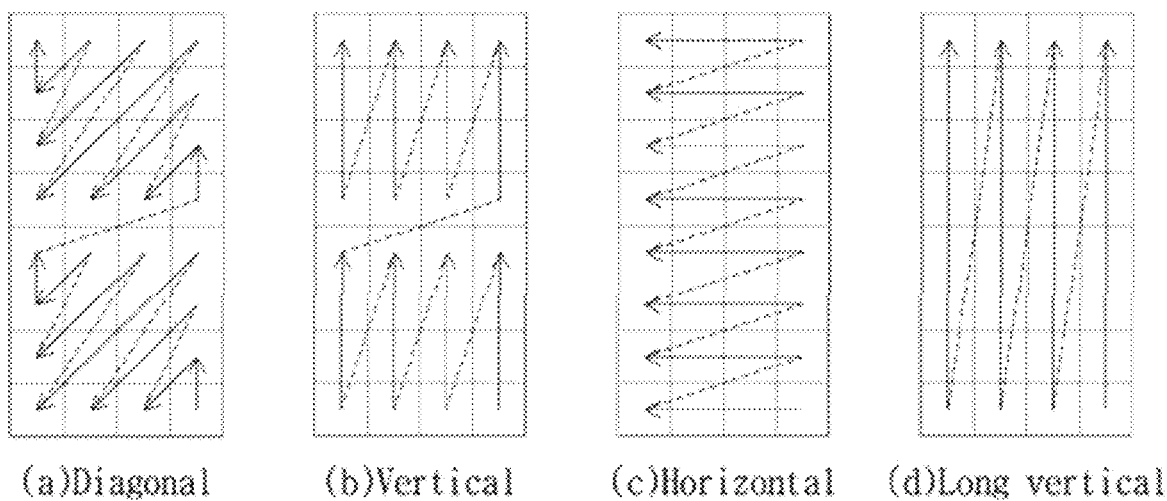
FIGS. 15 and 16 illustrate a method of scanning a non-square transform block, according to one application example of the present invention.
Figure 16:
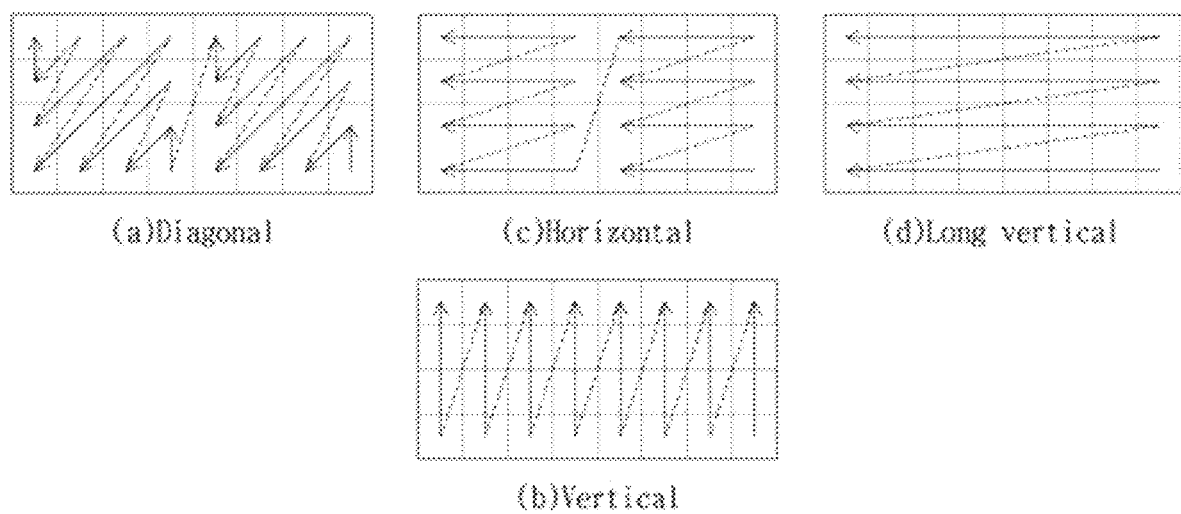

FIGS. 15 and 16 illustrate a method of scanning a non-square transform block, according to one embodiment to which the present invention is applied.

FIG. 15 illustrates a method of scanning an 8×4 transform block.

FIG. 15(a) illustrates a case where the scan type is the diagonal scan and scanning is performed on a per group basis, in which one group includes 4×4 coefficients. In this case, transform coefficients in a transform block may be scanned from a bottom coefficient group to a top coefficient group, in which coefficients in each group are scanned from a top right end to a bottom left end according to a diagonal scan direction. FIG. 15(b) illustrates a case where the scan type is the vertical scan and scanning is performed on a per group basis in which one group includes 4×4 coefficients. In this case, transform coefficients in the transform block may be scanned from a bottom coefficient group to a top coefficient group, in which coefficients in each group are scanned from bottom to top according a vertical scan direction. FIG. 15(c) illustrates a case where the scan type is the horizontal scan and scanning is performed on a per group basis, in which one group includes 4×4 coefficients. In this case, transform coefficients in the transform block may be scanned from a bottom coefficient group to a top coefficient group, in which coefficients in each group are scanned from right to left according to a horizontal scan direction. Alternatively, as illustrated in FIG. 15(d), transform coefficients in a 8×4 transform block may be scanned on a per group based in which one group includes 8×4 transform coefficients and scanning is performed from bottom to top according to a vertical scanning direction. For the 8×4 block, scan type candidates may include at least one of a diagonal scan, a vertical scan, and a horizontal scan, and a coefficient group may be a 4×4 group or an 8×4 group. A method of determining a scan type and a scan group may be the same as described above.

FIG. 16 illustrates a scanning method for a 4×8 transform block.

FIG. 16(a) illustrates a case where the scan type is the diagonal scan and scanning is performed on a per group basis, in which the scan group is a group of 4×4 coefficients. In this case, transform coefficients in the transform block may be scanned from a left coefficient group to a right coefficient group, in which coefficients in each group are scanned from a top right end to a bottom left end according to a diagonal scan direction. FIG. 16(b) illustrates a case where the scan type is the vertical scan and scanning is performed on a per group basis in which the scan group is a group of 4×4 coefficients. In this case, transform coefficients in the transform block may be scanned from a right coefficient group to a left coefficient group, in which coefficients in each group are scanned from bottom to top according a vertical scan direction. FIG. 16(c) illustrates a case where the scan type is the horizontal scan and scanning is performed on a per group basis, in which the scan group is a group of 4×4 coefficients. In this case, transform coefficients in the transform block may be scanned from a right coefficient group to a left coefficient group, in which coefficients in each group are scanned from right to left according to a horizontal scan direction. Alternatively, as illustrated in FIG. 16(d), transform coefficients in a 4×8 transform block may be scanned on a per group based in which the scan group is a group of 4×8 coefficients and scanning is performed from right to left according to a horizontal scan direction. For the 4×8 block, scan type candidates may include at least one of a diagonal scan, a vertical scan, and a horizontal scan, and a coefficient group may be a 4×4 group or an 4×8 group. A method of determining a scan type and a scan group may be the same as described above.

The video decoding apparatus may acquire transform coefficients in a transform block by entropy-decoding a received bit-stream. The video decoding apparatus may determine the scan type on the basis of at least one of coding block information (for example, a largest/smallest size, a partitioning technique, etc.), a size/shape of a transform block, a size/shape of a coefficient group, a prediction mode, intra prediction information (for example, an intra prediction mode value, a directionality, an angle, etc.), and inter prediction information. When the intra prediction mode has a horizontal directionality, the vertical scan may be used. When the intra prediction mode has a vertical directionality, the horizontal scan may be used. The video decoding apparatus may specify any one of multiple scan type candidates on the basis of the energy of the transform coefficients or an index signaled from the video encoding apparatus.

Figure 18:
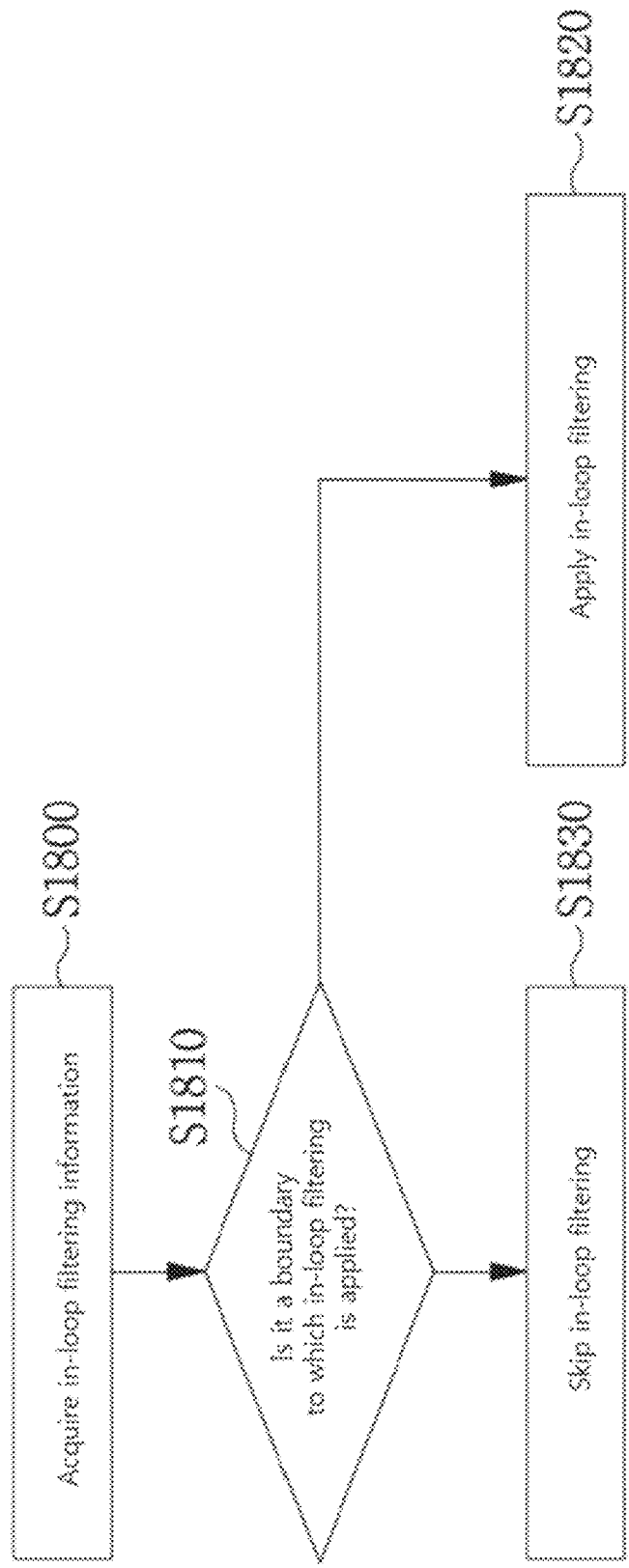
FIG. 18 illustrates a method of determining an application range of in-loop filtering according to one application example of the present invention.

Referring to FIGS. 17 to 19, a method of applying in-loop filtering to a block boundary will be described.

FIG. 17 illustrates ranges to which in-loop filtering is applied, according to embodiments to which the present invention is applied.

Referring to FIG. 17, a dotted line represents a visual block boundary, a bold solid line represents a coding block boundary, and a thin solid line represents a pixel boundary. Here, the virtual block may mean a sub-block having an arbitrary size and/or shape within a coding block. In-loop filtering may be symmetrically or asymmetrically applied to a virtual block boundary or a coding block boundary. The in-loop filtering may be applied to an equal area (range) for every block or to different ranges for respective blocks according to attributes of the blocks. The shape of the range (hereinafter, referred to as an application range) to which the in-loop filtering is applied may be one-dimensional band form or a two-dimensional block form. In the present invention, information on in-loop filtering may be fixed information preset in the video encoding apparatus and the video decoding apparatus or may be variable information signaled using a bit-stream.

In the present embodiment, for convenience of description, it is assumed that the shape of a filter is one-dimensional and the application range covers two pixels on each side of a block boundary (i.e., two pixels on the left side and two pixels on the right side of a block boundary).

Referring to FIG. 17(a), gray pixels around a boundary 401 are pixels to which in-loop filtering is applied. When the virtual block has a small size as illustrated in FIG. 17(b), the application range around a virtual block boundary 411 and the application range around a virtual block boundary 412 overlap. On the other hand, when the virtual block has a large size as illustrated in FIG. 17(c), there may be an area which is covered by neither the application range around a virtual block boundary 421 nor the application range around a virtual block boundary 422. That is, there may be various embodiments according to at least one of the size of the application range for filtering and the size of the virtual block.

For example, when the application range for filtering covers three pixels on each side of a boundary (i.e., three pixels on the left side and three pixels on the right side) in FIGS. 17(a) and 17(b), there occurs a region to which filtering is applied multiple times. On the other hand, when the application range of filtering covers one pixel on each side of a boundary (i.e., one pixel on the left side and one pixel on the right side) in FIGS. 17(a) through 17(c), there is a region to which filtering is not applied multiple times. In one embodiment, the application range for filtering may be zero pixels on each side of the boundary. That is, application of in-loop filtering may be skipped.

FIGS. 17(e), 17(f), and 17(g) illustrate both of a coding block boundary and a virtual block boundary. Here, dark gray areas represent an application range around a coding block boundary to which in-loop filtering is applied and a bright gray area represents an application range around a virtual block boundary to which in-loop filtering is applied. As illustrated in FIG. 17(e), the shapes/sizes of in-loop filters used for a coding block and a virtual block may be identical to each other. As illustrated in FIG. 17(f), in-loop filtering may be applied only to coding block boundaries and application of in-loop filtering to the virtual block boundaries may be skipped. As illustrated in FIG. 17(g), an in-loop filter for a coding block boundary and an in-loop filter for a virtual block boundary may have different application ranges. When the virtual block is a non-square block, filters used respectively for a horizontal boundary and a vertical boundary may differ in at least one of the size, shape, or application range of the filter. For a block to which in-loop filtering is applied multiple times, application of in-loop filtering to the entire region or to the overlapped region may be skipped.

FIG. 18 illustrates a method of determining an application range for in-loop filtering according to one embodiment to which the present invention is applied.

Referring to FIG. 18, in-loop filtering information can be acquired (S1800).

The in-loop filtering information may include at least one of filter information for a boundary of a virtual block and filter information for a boundary of a coding block. One piece of in-loop filtering information may be commonly used for filtering a coding block boundary and filtering a virtual bock boundary. The filter information for a virtual block boundary can be used for filtering a coding block boundary, and conversely the filter information for a coding block boundary can be used for filtering a virtual block boundary. Different pieces of filter information may be respectively used for a coding block boundary and a virtual block boundary.

The information may be signaled using a bit-stream, may be derived, or may be information preset in the video encoding apparatus and the video decoding apparatus. A part of pieces of the information may be signaled using a bit-stream, and the remaining pieces of the information may be information preset in the video encoding apparatus and the video decoding apparatus.

Whether a current boundary is a boundary to which in-loop filtering is applied may be determined (S1810). A method of determining a coding block boundary and/or a virtual block boundary to which in-loop filtering is applied may be derived/determined based on information signaled using a bit-stream, may be preset in the video decoding apparatus, or may be determined based on the derived information.

When the current boundary is determined to be a boundary to which in-loop filtering is applied, in-loop filtering may be applied to the current boundary (S1820). Application of the in-loop filtering may include a process of determining the optimum in-loop filter suitable for the current boundary. The size/shape of an in-loop filter for the current boundary may be determined based on at least one of a quantization parameter, values of pixels on the boundary, values of one or more neighboring pixels, a reference picture index, information on whether the boundary corresponds to luma components, a type of a chroma component, the length of the boundary, and attributes of a block to which the boundary belongs.

On the other hand, when the current boundary is determined not to be a boundary to which in-loop filtering is applied, in-loop filtering may not be applied to the current boundary (S1830).

ON/OFF information on application of in-loop filtering may be signaled using a bit-stream at any level of various levels such as a sequence level, a picture level, a slice level, a tile level, a block level, a coding unit group level, a coding unit level, and a sub-coding unit level. Although ON is set for an upper level, selective application may be performed at a lower level according to the ON/OFF information. ON information indicating that in-loop filtering is applied to both of the coding block boundary and the virtual block boundary may be signaled at a video sequence level. OFF information indicating that in-loop filtering is applied to neither the coding block boundary nor the virtual block boundary within a specific picture may be signaled. When the size of a virtual block is equal to one pixel size, the pixels constituting the respective virtual blocks may have different motion vectors. In this case, application of the in-loop filtering to the virtual block boundaries may be skipped. In addition, as illustrated in FIG. 17(b), when an application range for in-loop filtering over two boundaries, application of in-loop filtering to one of the two boundaries may be skipped. In some cases, in-loop filtering may be applied only to the coding block boundaries and application of in-loop filtering to the virtual block boundaries may be selectively skipped.

FIG. 19 illustrates a method of applying in-loop filtering to a boundary of a geometrical shape, according to one embodiment to which the present invention is applied.

The boundary may have an arbitrary shape other than a rectangle according to a block partitioning structure illustrated in FIGS. 10(f) and 10(g). In this case, as illustrated in FIG. 19, in-loop filtering may be applied. FIGS. 19(a) and 19(b) illustrate block boundaries and FIGS. 19(c) and 19(d) are enlarged views thereof. In FIGS. 19(c) and 19(d), a square block represents a pixel. The in-loop filtering is applied for every two pixels at the boundary. The shape of the boundary and the filter application range may vary from embodiment to embodiment. For example, as illustrated in FIG. 19(a), a rectangular block can be divided into two triangular blocks by a diagonal line. As described above with reference to FIG. 10, two triangular blocks can be inter-predicted respectively by using different motion information (for example, motion vectors, prediction directions, reference pictures, etc.). When a rectangular block is divided into two triangular blocks by a diagonal line, it can be divided in two directions. One direction is illustrated in FIG. 19(a). The other division direction means a division by a diagonal line extending from the bottom left corner to the top right corner. Accordingly, when a rectangular block is divided into two triangular blocks, information on the division direction is signaled. A final prediction bock is generated on the basis of two prediction blocks generated through inter predictions. In this case, pixels within a predetermined range from the diagonal line may be filtered. In FIG. 19(c), the predetermined range means two pixels. However, the predetermined range is not limited to two pixels. That is, the predetermined range can be three pixels. The filtering is performed by placing different weights on the respective prediction samples according to the distance from a corresponding pixel to the diagonal line within each of the two prediction blocks.

Although exemplary methods of the present disclosure are represented in a series of steps for clarity of a description, the exemplary methods are not intended to limit the sequence of steps. Some steps may be performed simultaneously or may be performed in a different order as necessary. In order to implement the method presented by the present disclosure, an additional step may be added to the exemplary method, some steps in the exemplary method may be omitted, or some steps in the exemplary method are omitted and an additional step may be added to the exemplary method.

The various embodiments in the present disclosure are not intended to show all possible combinations but are intended to show only some representative aspects of the present disclosure. Elements described in various embodiments may be independently applied or may be used in combination of two or more of them.

In addition, various embodiments of the present disclosure may be implemented by a hardware module, a software module, or a combination thereof. A hardware implementation may mean implementation by one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure includes software or machine-executable commands (for example, operating systems, applications, firmware, programs, etc.) causing methods of various embodiments to be executed on a device or a computer, and a non-transitory computer-readable medium in which such software or machine-executable commands are stored so as to be executable on a device or a computer.

INDUSTRIAL APPLICABILITY

The present invention may be used to encode/decode a video signal.

What is claimed is:

1. An inter prediction method comprising:
acquiring motion vector refinement information of a current block;
generating a motion vector of the current block;
refining the motion vector of the current block, based on the motion vector refinement information;
generating a prediction block of the current block based on the refined motion vector of the current block; and
reconstructing the current block based on the prediction block,
wherein the refined motion vector of the current block is derived by using a reconstructed block which is previously decoded from the current block,
wherein the refinement of the motion vector of the current block is performed based on a block size of the current block, and
wherein the refinement of the motion vector of the current block is performed when bidirectional prediction is performed on the current block,
wherein the refinement of the motion vector of the current block is performed with sub-pel precision.

2. The inter prediction method of claim 1, wherein the refined motion vector of the current block is used to determine a motion vector of a picture to be subsequently decoded.

3. The inter prediction method of claim 1, wherein the refinement of the motion vector is performed when a width or a height of the current block is greater than or equal to a predetermined value.

4. An inter prediction method comprising:
- determining a prediction mode of a current block as an inter prediction mode;
- generating a motion vector of the current block;
- determining motion vector refinement information of the current block based on the motion vector of the current block;
- generating a prediction block of the current block based on the refined motion vector of the current block;
- reconstructing the current block based on the prediction block; and
- encoding the motion vector refinement information,
- wherein the motion vector refinement information is used to refine the motion vector of the current block in a decoding process,
- wherein the refined motion vector of the current block in the decoding process is derived by using a reconstructed block which is previously decoded from the current block in the decoding process,
- wherein the refinement of the motion vector of the current block in the decoding process is performed based on a block size of the current block,
- wherein the refinement of the motion vector of the current block is performed when bidirectional prediction is performed on the current block, and
- wherein the refinement of the motion vector of the current block is performed with sub-pel precision.

5. A non-transitory computer-readable recording medium storing a bitstream that is generated by an image encoding method with an encoding apparatus, wherein the image encoding method comprises:
- determining a prediction mode of a current block as an inter prediction mode;
- generating a motion vector of the current block;
- determining motion vector refinement information of the current block based on the motion vector of the current block;
- generating a prediction block of the current block based on the refined motion vector of the current block;
- reconstructing the current block based on the prediction block; and
- encoding the motion vector refinement information,
- wherein the motion vector refinement information is used to refine the motion vector of the current block in a decoding process,
- wherein the refined motion vector of the current block in the decoding process is derived by using a reconstructed block which is previously decoded from the current block in the decoding process,
- wherein the refinement of the motion vector of the current block in the decoding process is performed based on a block size of the current block,
- wherein the refinement of the motion vector of the current block is performed when bidirectional prediction is performed on the current block, and
- wherein the refinement of the motion vector of the current block is performed with sub-pel precision.

* * * * *